United States Patent
Hedtke et al.

(10) Patent No.: US 8,505,423 B2
(45) Date of Patent: Aug. 13, 2013

(54) WEIGHT MATERIAL DISPENSING AND CUTTING SYSTEM

(75) Inventors: Louis R. Hedtke, St. Clair Shores, MI (US); Matthew W. King, Mt. Clemens, MI (US); Scott R. Claxton, Ortonville, MI (US); Mark A. Compton, Lake Orion, MI (US); Christopher J. Marcus, Lake Orion, MI (US); Mark R. Gabel, Cottage Grove, MN (US)

(73) Assignees: Esys Corporation, Auburn Hills, MI (US); 3M Innovative Properties Company, Saint Paul, MN (US)

( * ) Notice: Subject to any disclaimer, the term of this patent is extended or adjusted under 35 U.S.C. 154(b) by 681 days.

(21) Appl. No.: 12/683,495

(22) Filed: Jan. 7, 2010

(65) Prior Publication Data
US 2010/0175522 A1 Jul. 15, 2010

Related U.S. Application Data

(60) Provisional application No. 61/143,284, filed on Jan. 8, 2009.

(51) Int. Cl.
*B26D 5/20* (2006.01)
*B26D 7/00* (2006.01)
*B26D 7/18* (2006.01)

(52) U.S. Cl.
USPC ............ 83/76.6; 83/167; 83/109; 83/369; 83/416

(58) Field of Classification Search
USPC ............ 83/13, 151, 649, 408, 418, 436.5, 83/76.6, 167, 109, 416, 369, 73, 77, 7, 9, 83/358, 359, 65, 240, 420, 271; 73/468, 73/470; 177/64, 80, 119, 1, 66
See application file for complete search history.

(56) References Cited

U.S. PATENT DOCUMENTS

| | | | |
|---|---|---|---|
| 3,177,039 A | 4/1965 | Skidmore | |
| 3,273,941 A | 9/1966 | Skidmore | |
| 3,732,761 A * | 5/1973 | Sanders | 83/37 |
| 3,779,119 A | 12/1973 | Broides | |
| 3,800,894 A * | 4/1974 | Keser et al. | 177/64 |
| 3,960,409 A | 6/1976 | Songer | |
| 4,003,525 A | 1/1977 | Podvin et al. | |
| 4,335,439 A * | 6/1982 | St. Denis | 702/173 |
| 4,689,457 A * | 8/1987 | Izumiya et al. | 219/69.12 |
| 5,956,205 A | 9/1999 | Konno et al. | |
| 5,959,205 A | 9/1999 | Yamaya et al. | |

(Continued)

OTHER PUBLICATIONS

3M Wheel Weight System, TN-2015 and TN-2023, Technical Data Sheet, May 2007, 2 pages.

(Continued)

*Primary Examiner* — Ghassem Alie

(57) ABSTRACT

An apparatus includes a receiving module, a conversion module, first and second rollers, a motor, and a cutting head. The receiving module receives a desired weight value. The conversion module converts the desired weight value to a first length of wheel weight material based on a linear density of the wheel weight material. The first and second rollers engage first and second opposing sides of a continuous strip of the wheel weight material. The linear density of the wheel weight material is approximately constant along the continuous strip. The motor directly drives the first roller based on the first length. The cutting head is selectively actuated to cut the wheel weight material.

19 Claims, 19 Drawing Sheets

(56) References Cited

U.S. PATENT DOCUMENTS

| | | |
|---|---|---|
| 6,119,814 A | 9/2000 | Kane et al. |
| 6,125,904 A | 10/2000 | Kane et al. |
| 6,176,288 B1 | 1/2001 | Kane et al. |
| 6,209,684 B1 | 4/2001 | Kane et al. |
| 6,234,232 B1 | 5/2001 | Kane et al. |
| 6,286,906 B1 | 9/2001 | Nagashima et al. |
| 6,364,421 B1 | 4/2002 | Pursley |
| 6,364,422 B1 | 4/2002 | Sakaki et al. |
| 6,413,626 B1 | 7/2002 | Wollner |
| 6,481,083 B1 | 11/2002 | Lawson et al. |
| 6,502,618 B1 | 1/2003 | Sachs et al. |
| 6,581,444 B2 | 6/2003 | Bal |
| 6,616,089 B2 | 9/2003 | Gross et al. |
| 6,877,544 B2 | 4/2005 | Kane et al. |
| 6,886,231 B2 | 5/2005 | Lawson et al. |
| RE39,312 E | 10/2006 | Kane et al. |
| 7,185,410 B2 | 3/2007 | Lawson et al. |
| 7,478,659 B2 | 1/2009 | Jeon |
| 7,600,306 B2 | 10/2009 | Lawson et al. |
| 8,161,650 B2 | 4/2012 | Lawson et al. |
| 8,336,379 B2 | 12/2012 | Rogalla et al. |
| 2006/0016309 A1 | 1/2006 | Spaulding et al. |
| 2006/0169415 A1 | 8/2006 | Lawson et al. |
| 2007/0074824 A1 | 4/2007 | Lawson et al. |
| 2008/0156447 A1 | 7/2008 | Lawson et al. |
| 2009/0001803 A1 | 1/2009 | Taylor |
| 2009/0084506 A1 | 4/2009 | Lawson et al. |
| 2010/0051206 A1 | 3/2010 | Lawson |
| 2010/0059154 A1 | 3/2010 | Perecman |
| 2010/0147458 A1 | 6/2010 | Donnay et al. |
| 2010/0154611 A1* | 6/2010 | Lammlein, Jr. .......... 83/78 |
| 2010/0163189 A1 | 7/2010 | Lawson et al. |

OTHER PUBLICATIONS

3M Mechanical Replacement Weight, TN4014 (PN99427), Technical Data Sheet, Oct. 2008, 2 pages.

3M Engineering Drawings, 2007, 48 pages.

* cited by examiner

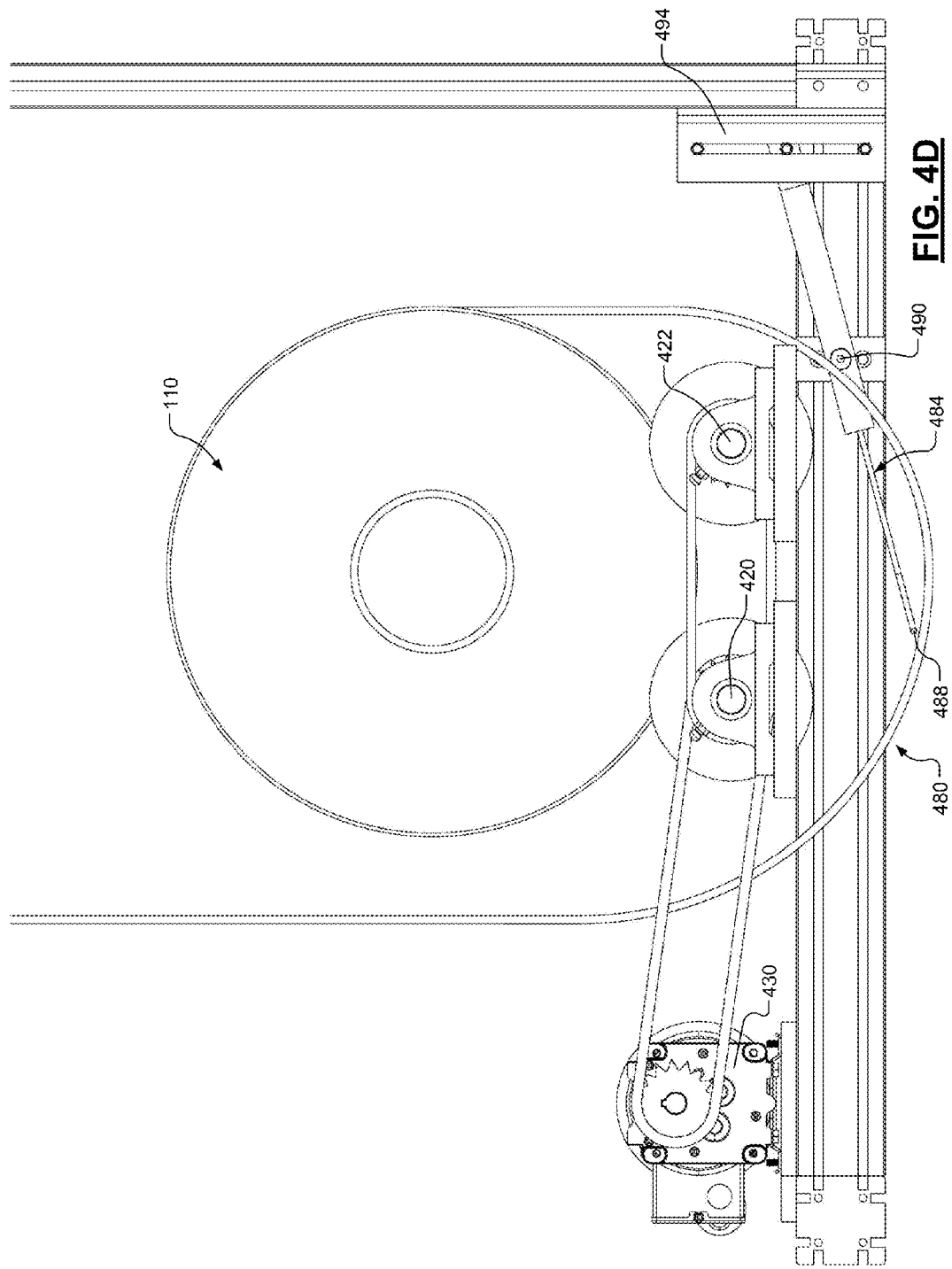

WEIGHT MATERIAL DISPENSING AND CUTTING SYSTEM

CROSS-REFERENCE TO RELATED APPLICATIONS

This application claims the benefit of U.S. Provisional Application No. 61/143,284, filed on Jan. 8, 2009. The disclosure of the above application is incorporated herein by reference in its entirety.

FIELD

The present disclosure relates to weight material, and more particularly to weight material dispensing and cutting systems and methods of operating such systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Rotating assemblies are used in many applications. For example only, in automotive applications, wheel/tire assemblies are used to couple the vehicle to the ground. As the vehicle moves, wheel/tire assemblies rotate many times. At higher rates of speed, any weight imbalance in the wheel/tire assemblies may result in vibration, which increases wear on vehicle components and may be perceived as a poor ride by the driver.

As a result, wheel/tire assemblies are balanced in a balancing process. A balancing machine may spin a wheel/tire assembly to determine which points of the wheel/tire assembly require more or less weight so that the weight will be evenly distributed across the assembly. In most applications, it is easier to add additional weight than to remove weight.

The balancing machine may therefore determine how much weight to add to which locations of the wheel/tire assembly in order to balance the weight distribution of the assembly. In various implementations, two locations on the assembly may be selected, although more or fewer are possible. The balancing locations may be predetermined, and the balancing machine simply determines how much weight to apply to each of the predetermined balancing locations.

For a rimmed wheel, lead pound-on weights may be attached to the rim of the wheel. For example, lead weights from 0.5 ounces to 10 ounces in increments of 0.5 ounces may be stocked by businesses that balance wheel/tire assemblies. In this example, 20 different part numbers of lead weights must be inventoried and managed. The various lead weights may not look appreciably different in size, thereby leading to inadvertent mixing of the weights and inadvertent use of the wrong size of weight. In addition, lead toxicity is a concern. Other materials may be used for pound-on weights, such as iron. With iron pound-on weights, rust may be a concern.

To address these concerns, systems of encased lead weights have been developed. In these systems, individual weights (such as 0.5 ounce weights) are encased in a non-toxic coating, such as plastic, and the coating connects the individual weights together to form a segmented strip. Depending on the weight desired for balancing, the corresponding number of weights can be cut from the strip. The segmented strip of weights allows a single part number to be inventoried. The segmented strip may have an adhesive backing that secures the cut segments to the wheel/tire assembly. The non-toxic coating may protect against lead toxicity or rust.

SUMMARY

An apparatus includes a receiving module, a conversion module, first and second rollers, a stepper motor, a movable carriage, a forcing member, a scribe implement, and a cutting head. The receiving module receives a desired weight value. The conversion module converts the desired weight value to a first length of wheel weight material based on a linear density of the wheel weight material. The first and second rollers engage first and second opposing sides of a continuous strip of the wheel weight material. The linear density of the wheel weight material is approximately constant along the continuous strip. The stepper motor directly drives the first roller based on the first length. The movable carriage holds the second roller. The forcing member applies pressure to the movable carriage in a direction toward the first roller. The scribe implement selectively forms a scribe mark on the wheel weight material. The cutting head is selectively actuated to cut the wheel weight material.

In other features, an apparatus includes a receiving module, a conversion module, first and second rollers, a motor, and a cutting head. The receiving module receives a desired weight value. The conversion module converts the desired weight value to a first length of wheel weight material based on a linear density of the wheel weight material. The first and second rollers engage first and second opposing sides of a continuous strip of the wheel weight material. The linear density of the wheel weight material is approximately constant along the continuous strip. The motor directly drives the first roller based on the first length. The cutting head is selectively actuated to cut the wheel weight material.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2I is a composite of end, side, and isometric views of a drive roller depicted in FIG. 2H according to the principles of the present disclosure;

FIG. 4D is a partial rear view of an exemplary implementation of a dispensing apparatus according to the principles of the present disclosure;

DETAILED DESCRIPTION

Figure 1A:
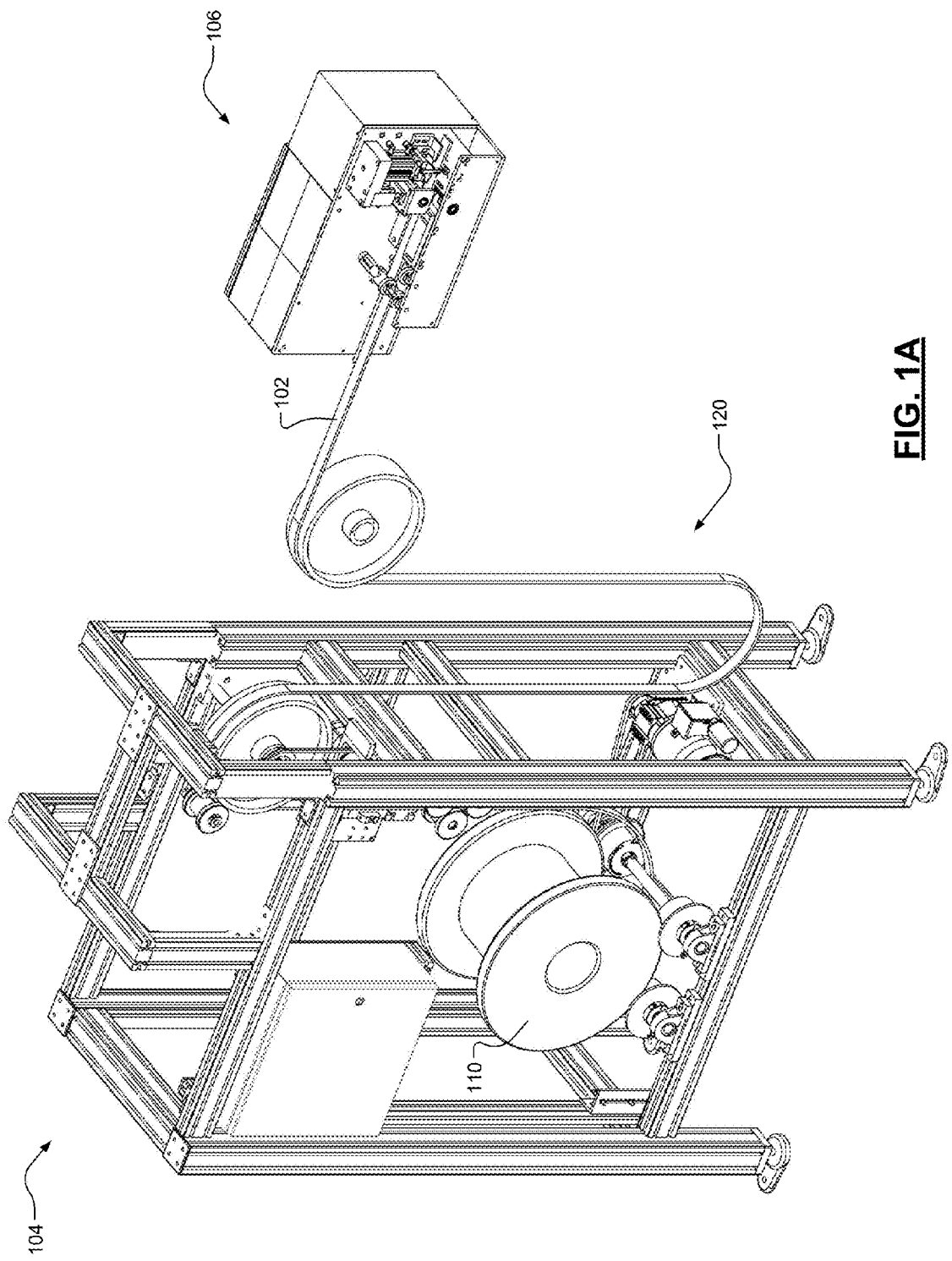
FIG. 1A is an isometric view of an exemplary continuous weight material dispensing and cutting system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

When individual lead or iron weights are encased and joined in a segmented strip, the granularity of control of the weight is limited. Cutting a segment with a partial lead weight is not an option because of the toxicity of the lead, and cutting the lead may be more difficult than cutting the casing. Similarly, cutting a segment with a partial iron weight exposes the iron to rust and may be more difficult than cutting only the casing. Weight pieces are therefore only available in increments of the individual weight. This may limit the accuracy of the balancing. In addition, if only half a segment in terms of weight is needed for balancing, the entire segment is used, thereby wasting half a segment.

To overcome the problems of this segmented design, a continuous strip of high-density weight material may be used. For ease of storage, handling, and transportation, the weight material may be flexible. For example, the weight material may be flexible enough to be stored in a roll. Because the weight material is continuous, the granularity of control of the weight of a segment can be made arbitrarily small. Manufacturing limitations may cause the linear density of the continuous weight material to vary slightly over the length of the continuous weight material. The precision of the cutting apparatus and the variance of the linear density of the weight material therefore determines the weight accuracy of pieces cut from a continuous strip of the weight material.

In contrast to segmented strips of lead or iron weights connected by a casing, continuous weight material may have a cross-section that is substantially uniform along the length of the continuous weight material. The segmented material has one cross-section where the lead/iron material is present and a different cross-section in the connecting spaces where only the casing is present.

Similarly, the linear density of the continuous weight material may remain approximately constant. This is in contrast to the segmented material, where the sections including lead/iron have a much higher linear density than the connecting sections. The continuous weight material may be available in different cross-sectional shapes and sizes to accommodate various aesthetic and packaging concerns.

One side of the continuous weight material may be partially or fully covered with an adhesive to allow a cut segment to be attached to a wheel. The adhesive may be in the form of an acrylic foam tape. A lining or backing may cover an exposed surface of the tape to prevent the tape from sticking to the continuous weight material when stored in a roll. In addition, the backing prevents contaminants from reducing the effectiveness of the adhesive. For example only, the continuous weight material may be available from the 3M Company, such as product numbers TN2015, TN2023, and TN4014.

For purposes of illustration only, the present disclosure describes continuous weight material in the context of wheel/tire assemblies. However, the systems and methods of the present disclosure apply to other applications where additional precise weights may be needed. For example only, precise weights may be used in balancing other components in both automotive and non-automotive applications. The components may be rotating components, such as a flywheel or a driveshaft, or may be components that reciprocate or other move in another fashion. The systems and methods of the present disclosure apply to weight balancing even for stationary objects, where desired weight balance parameters may be specified.

Figure 1B:
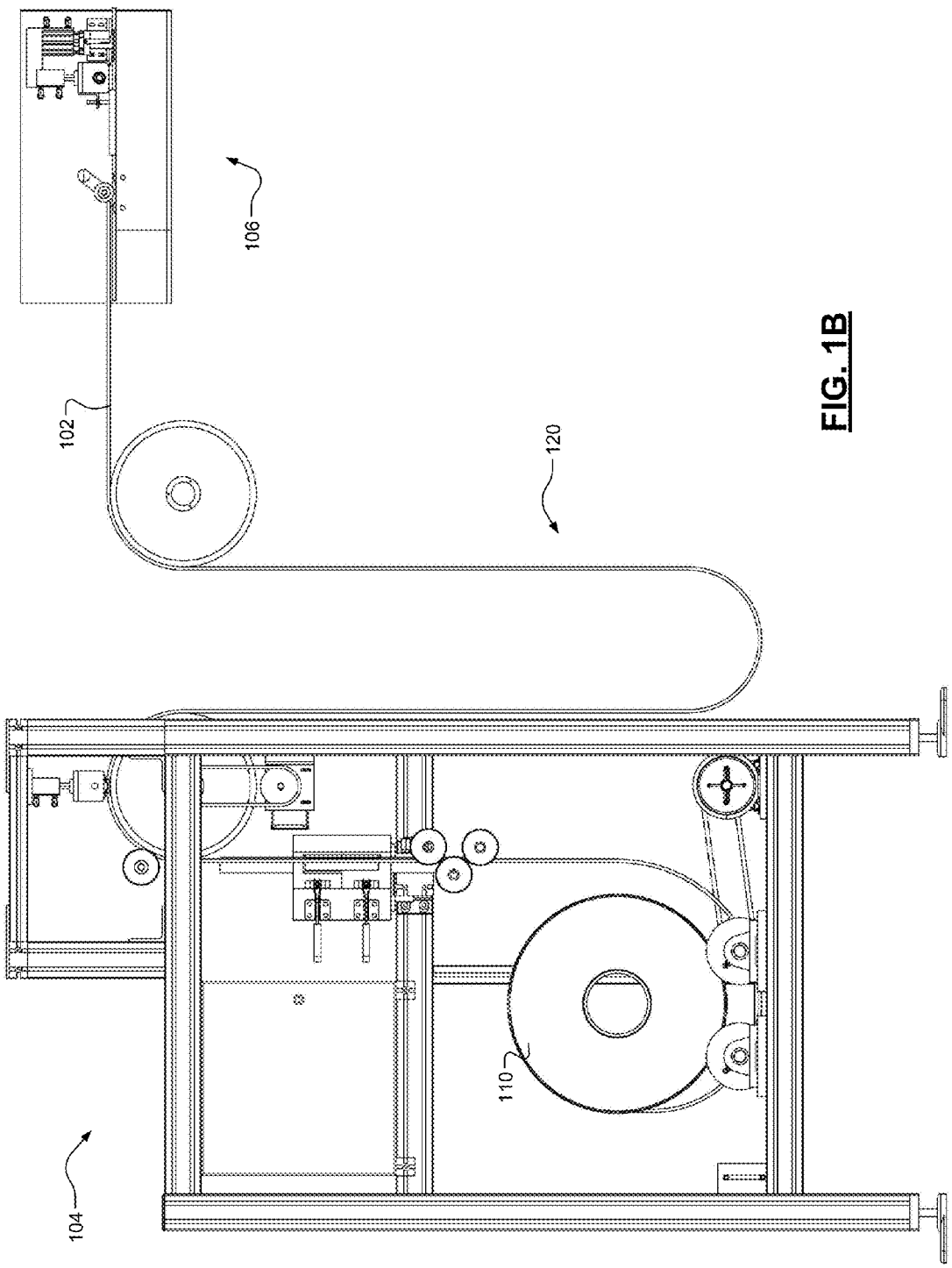
FIG. 1B is a front view of an exemplary continuous weight material dispensing and cutting system according to the principles of the present disclosure.

Referring now to FIGS. 1A and 1B, isometric and front views of a continuous weight material dispensing and cutting system are shown. A strip 102 of continuous weight material is provided from a dispensing apparatus 104 to a cutting apparatus 106. The dispensing apparatus 104 provides the strip 102 from a spool 110. The cutting apparatus 106 advances the strip 102 by a specified length, and then cuts the strip 102 to create a piece of weight material.

The dispensing apparatus 104 may create a loop 120 from the strip 102 so that advancing of the strip 102 by the cutting apparatus 106 does not have to be precisely synchronized with feeding of the strip 102 by the dispensing apparatus 104. In addition, the loop 120 provides a reserve of additional weight material to allow the cutting apparatus 106 to continue operating while the spool 110 is being changed. The size of the loop 120 may be limited by a distance to the floor. The size of the loop 120 may also be limited by the ability of the cutting apparatus 106 to pull the weight of the weight material included in the loop 120. For example, motor torque and/or friction may limit the amount of weight the cutting apparatus 106 can pull.

Figure 2A:
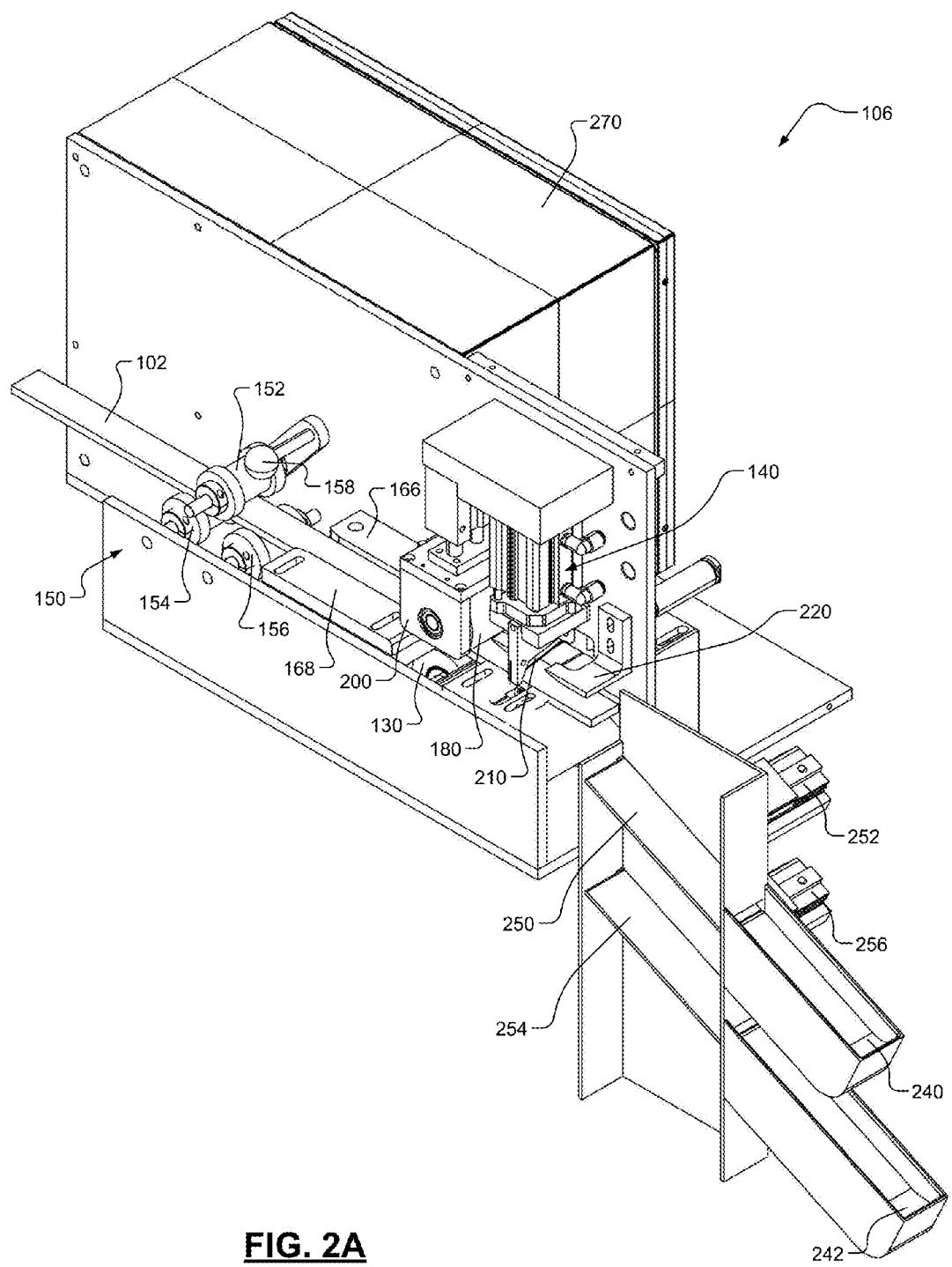
FIG. 2A is an isometric view of an exemplary implementation of a cutting apparatus according to the principles of the present disclosure.
Figure 2B:
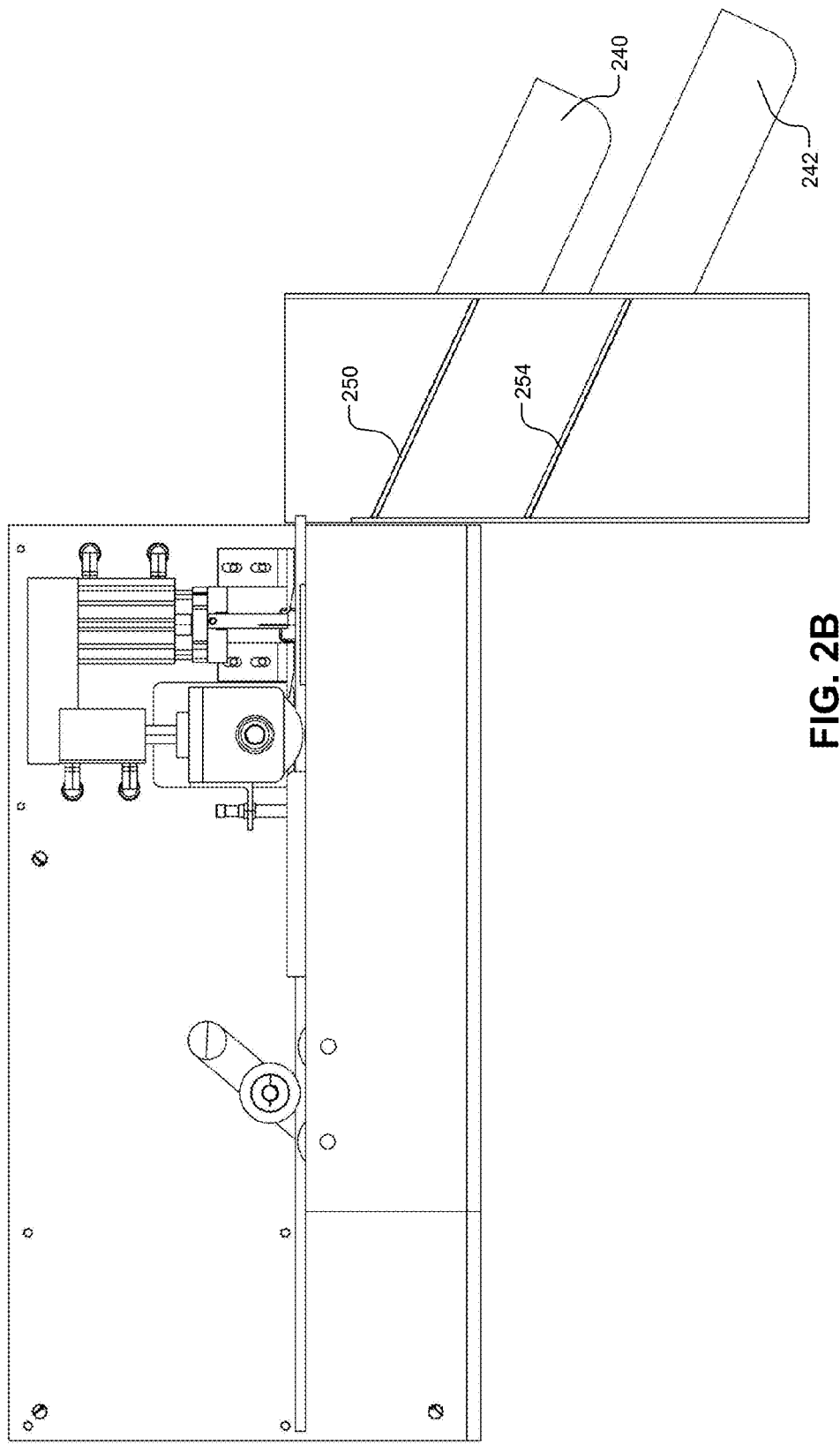
FIG. 2B is a side view of an exemplary implementation of a cutting apparatus according to the principles of the present disclosure.
Figure 2C:
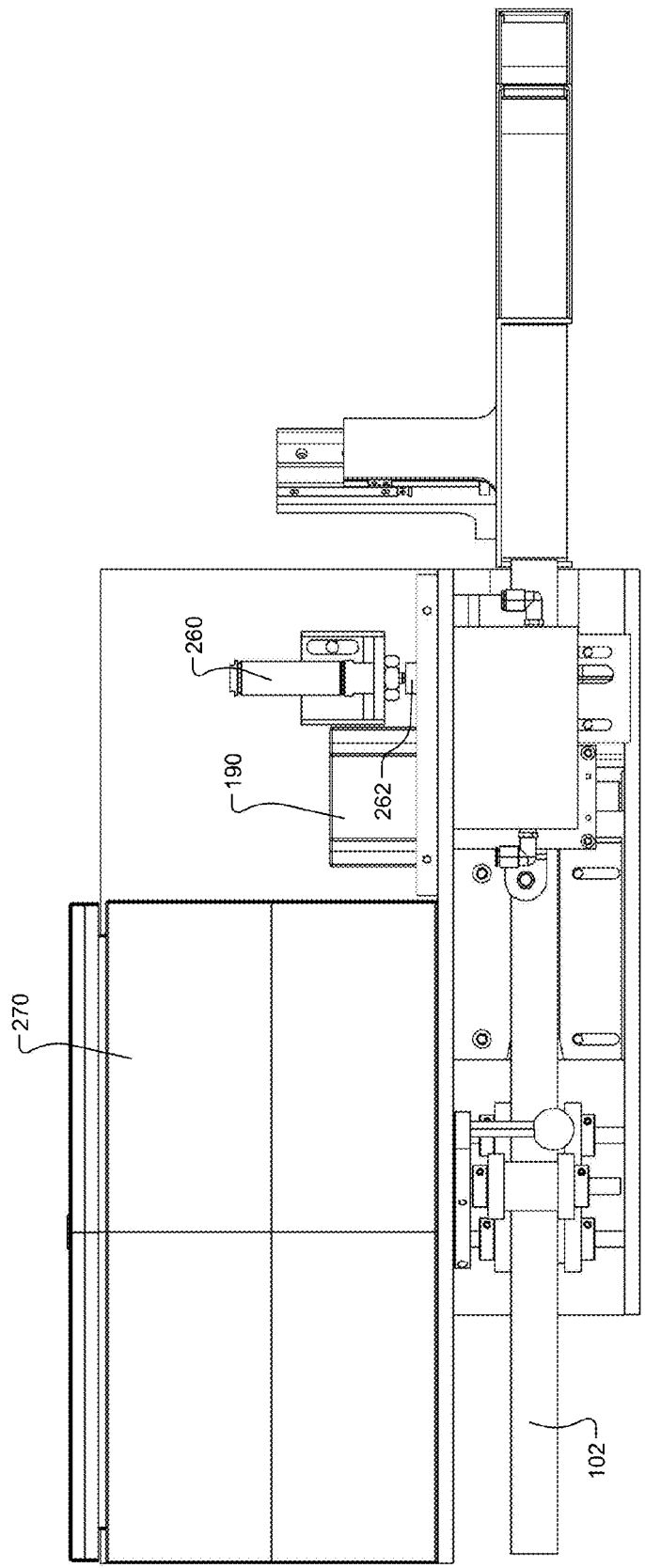
FIG. 2C is a top view of an exemplary implementation of a cutting apparatus according to the principles of the present disclosure.

Referring now to FIGS. 2A-2J, various views of an exemplary implementation of the cutting apparatus 106 are presented. The cutting apparatus 106 includes a drive roller 130 that advances a predetermined length of the strip 102. A cutting device 140 then cuts the strip 102, thereby creating a piece of weight material. Prior to reaching the drive roller 130, the strip 102 may be drawn through an alignment assembly 150. The alignment assembly 150 ensures that the strip 102 enters at the correct orientation and position. In various implementations, such as is shown in FIG. 2A, the alignment assembly 150 may include first, second, and third rollers 152, 154, and 156. In various implementations, one or more of the first, second, and third rollers 152, 154, and 156 may be eliminated.

Figure 2D:
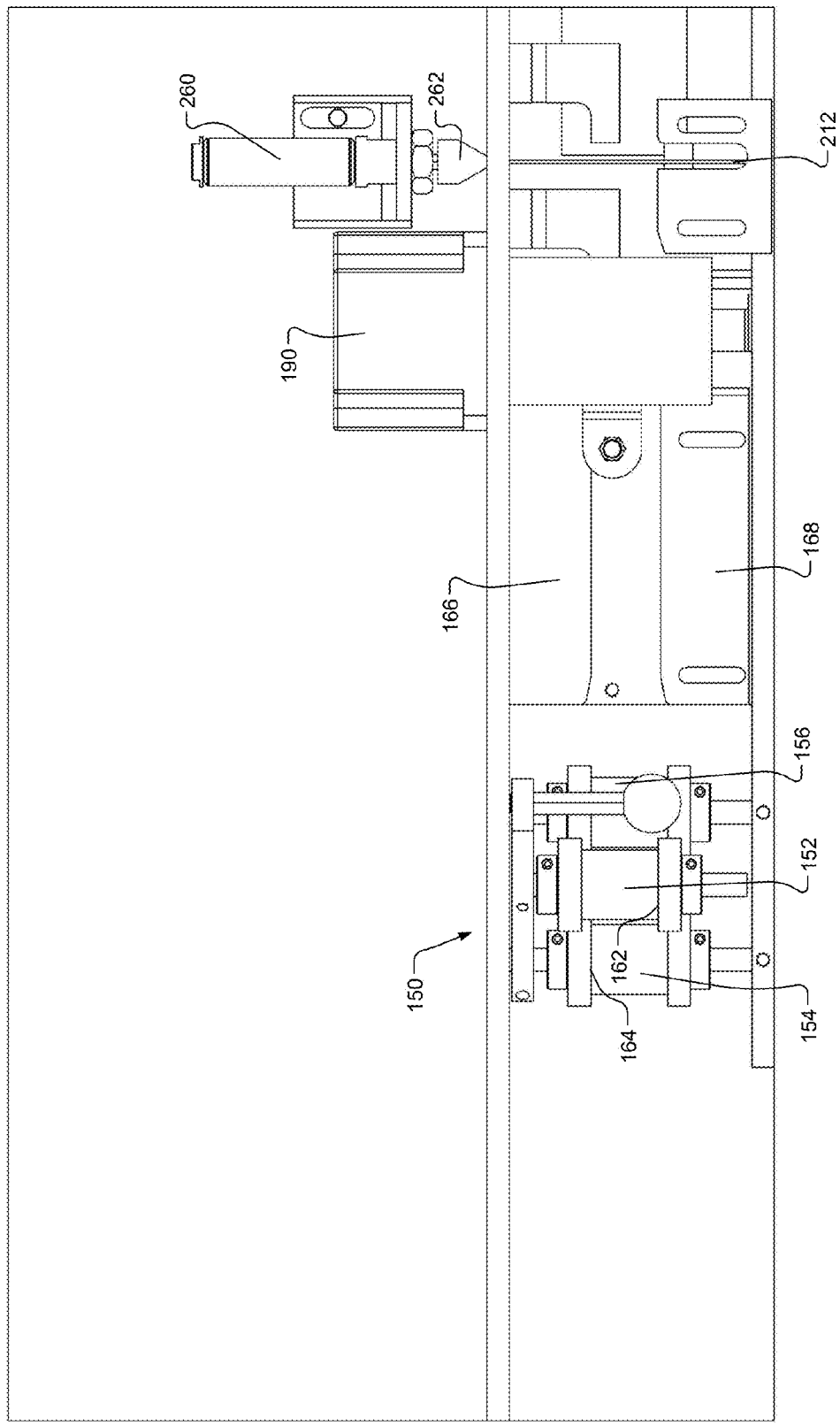
FIG. 2D is a simplified top view of an exemplary implementation of a cutting apparatus according to the principles of the present disclosure.
Figure 2E:
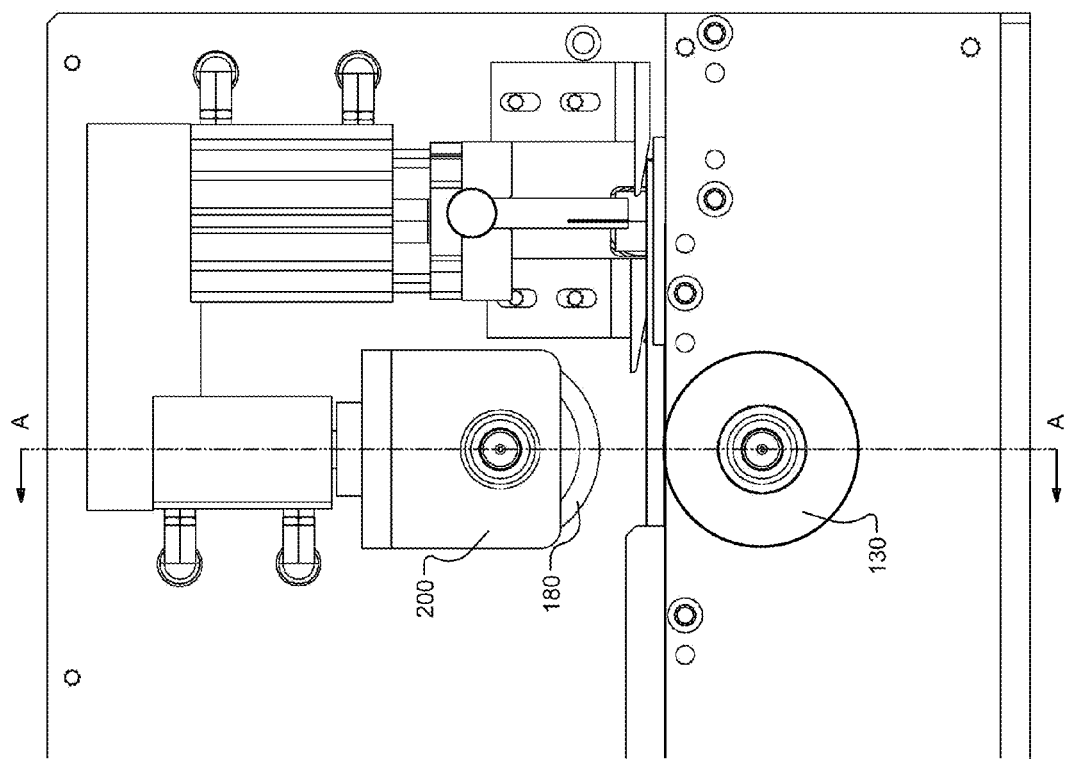
FIG. 2E is a partial front view of an exemplary implementation of a cutting apparatus according to the principles of the present disclosure.

The height of the first roller 152 may be adjusted based on the cross-sectional thickness of the strip 102. The first roller 152 may be adjusted using an adjustment knob 158. In FIG. 2D, a top view illustrates that the first roller 152 and the second and third rollers 154 and 156 may be adjusted laterally with respect to each other based on the cross-sectional width of the strip 102. In various implementations, the second and third rollers 154 and 156 may be fixed, while the first roller 152 is adjusted laterally.

A first edge 162 of the first roller 152 and a first edge 164 of the second roller 154 define the track for the strip 102. The distance between the first edges 162 and 164 may therefore be adjusted to be equal to or slightly greater than the cross-sectional width of the strip 102. First and second guides 166 and 168 may further prevent the strip from moving in a lateral direction. The second guide 168 may be adjusted based on the cross-sectional width of the strip 102. In various implementations, the first and second guides 166 and 168 may be shortened or eliminated altogether.

The drive roller 130 engages the strip 102 and pulls the strip 102 underneath the cutting device 140. The drive roller 130 presses the strip 102 against an idle roller 180. This increases the frictional force exerted on the strip 102 by the drive roller 130, thereby reducing slippage. The idle roller 180 may rotate freely, such as on low-friction bearings, to reduce rubbing that would otherwise occur if the drive roller 130 simply pressed the strip 102 against a fixed surface.

The drive roller 130 may be directly driven by a stepper motor 190. Directly driven means that the axle of the drive roller 130 is integral with or coupled in line with an output shaft of the stepper motor 190. Directly driven therefore means that the drive roller 130 rotates at the same angular speed as the stepper motor 190. Directly driven also means that an axis around which the drive roller 130 rotates is approximately collinear with an axis around which the output shaft of the stepper motor 190 rotates. One advantage of direct driving over other coupling mechanisms, such as gear, belt, or chain drives is that no slop or gear lash develops over time in a direct drive system.

Figure 2F:
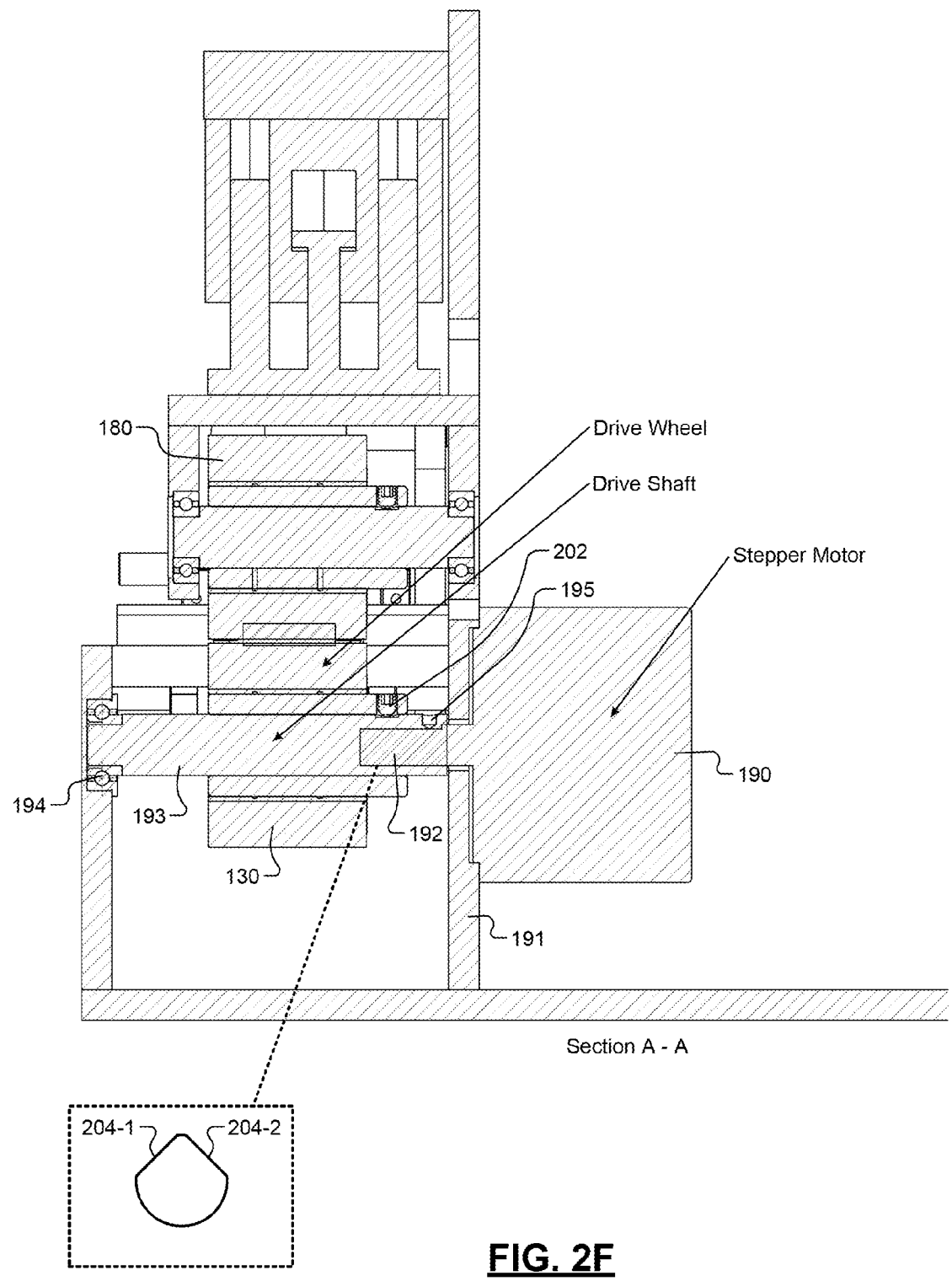
FIGS. 2F-2H are cross-sectional views of exemplary implementations of a cutting apparatus along the A-A line of FIG. 2E according to the principles of the present disclosure.
Figure 2G:
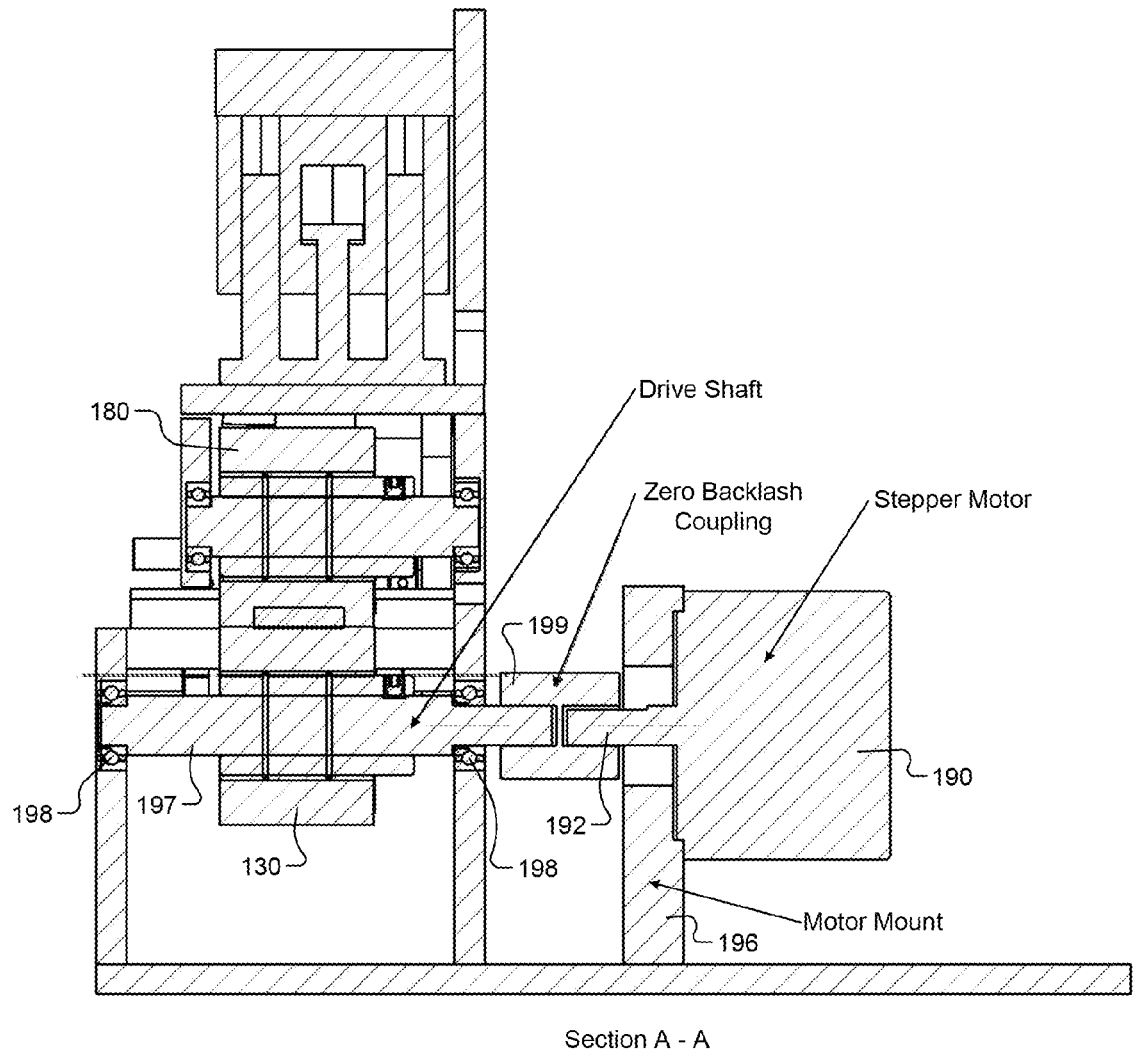
Figure 2H:
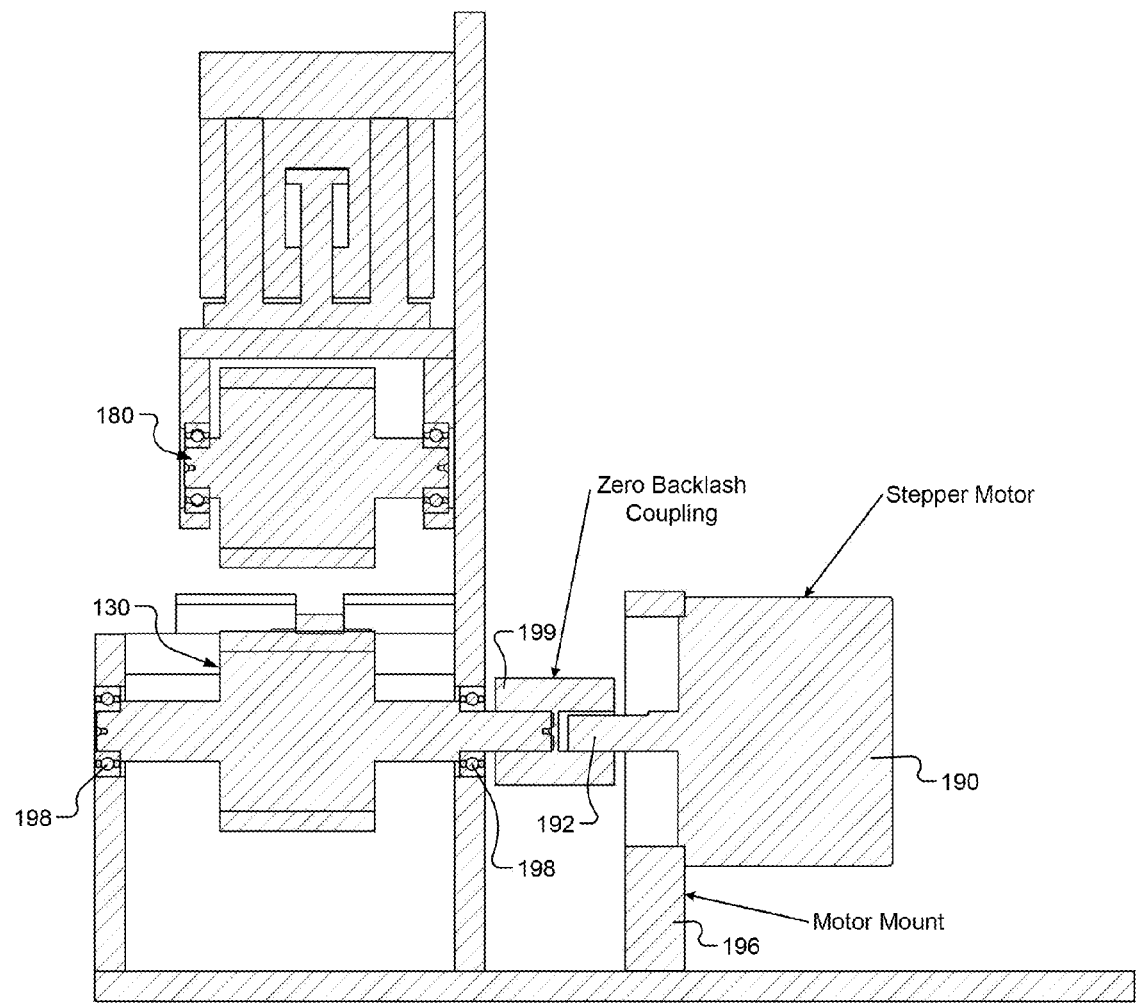
Figure 21:
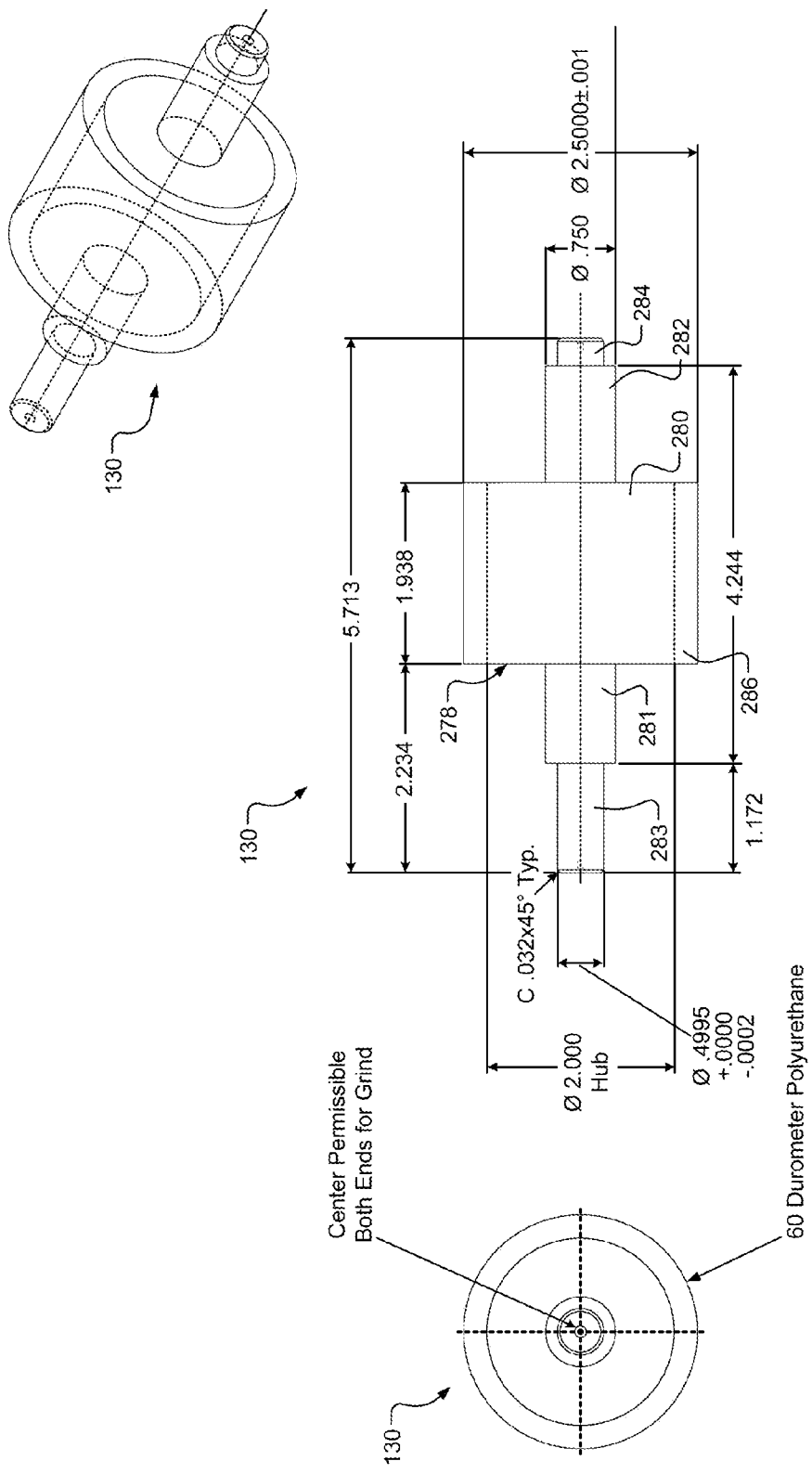

FIGS. 2F-2H depict exemplary configurations for direct driving. The stepper motor 190 is mounted to a rigid plate 191. An output shaft 192 of the stepper motor 190 fits into a corresponding void in a first end of a drive shaft 193. An opposite end of the drive shaft 193 rides in a bearing 194. The drive roller 130 is affixed to the drive shaft 193 and therefore rotates with the drive shaft 193. One or more set screws, such as set screw 202, may secure the drive roller 130 to the drive shaft 193.

One or more set screws 195 may secure the drive shaft 193 to the output shaft 192. For example only, the output shaft 192 may have a cross-section as shown in FIG. 2F, which is a circle with two portions defined by two chords of the circle removed. Two set screws 195 may bear against each flat section 204-1 and 204-2, respectively, of the cross-section.

Referring now to FIG. 2G, the stepper motor 190 is secured to a rigid motor mount 196. The drive roller 130 is affixed to a drive shaft 197, which is supported by bearings 198. The output shaft 192 is attached to a protruding end of the drive shaft 197 by a coupling 199. The coupling 199 may allow for a small amount of axial, lateral, and angular misalignment between the drive shaft 197 and the output shaft 192.

The misalignment is small and therefore the output shaft 192 and the drive shaft 197 are still approximately collinear, as required for direct driving. For example only, an angle misalignment of less than 1 degree and a lateral misalignment of less than 7 thousandths of an inch may still be considered approximately collinear with regard to the definition of direct driving. For applications where less precision is required, slightly more angular and lateral misalignment may be allowed, such as 5 degrees and 50 thousandths of an inch.

Referring now to FIG. 2H, a unitary version of the drive roller 130 is shown. The drive roller 130 incorporates an axle that is supported by the bearings 198 and attached to the output shaft 192 of the stepper motor 190 by the coupling 199.

Referring now to FIG. 2I, end, side, and isometric views of the drive roller 130 as shown in FIG. 2H. The drive roller 130 includes a unitary piece 278 having a roller core 280, axle ends 281 and 282, and bearing ends 283 and 284. The axle ends 281 and 282 are on either side of the roller core 280 and may have a smaller diameter than the roller core 280. The bearing ends 283 are on either end of the axle ends 281 and 282, respectively, and may have a smaller diameter than the axle ends 281 and 282.

The unitary piece 278 is formed from a single piece of material. In various implementations, the unitary piece 278 is rough machined, such as by using a lathe, from a piece of round stock, such as 1045 cold rolled steel. The roller core 280 is then coated with a cover material 286, which may have a high coefficient of friction and be more compliant than metal, such as 60-durometer polyurethane. The cover material 286 and the bearing ends 283 may then be finely machined, such as by using a surface grinder. In various implementations, the axle ends 281 and 282 may also be finely machined.

Referring back to FIG. 2A, the distance the strip 102 is moved with each step of the stepper motor 190 depends on configuration of the stepper motor 190 and an electrical driver of the stepper motor 190, as well as the diameter of the drive roller 130. For example only, the distance moved with each step may be between 7 and 8 ten thousandths of an inch, or may be four thousandths of an inch. For example only, a system according to the principles of the present disclosure may allow pieces of weight material to be generated with a repeatability of approximately 0.5 or 0.25 grams.

The variation in linear density of the weight material, and not the accuracy of the cutting system, may be the limiting factor with regard to weight repeatability. For example only, a system according to the principles of the present disclosure may produce pieces of weight material whose length deviates from the desired length (which may be calculated based on desired weight) by no more than plus or minus 0.5%, for a total range of 1%.

The idle roller 180 is mounted in a carriage 200. The carriage 200 may move up and down with respect to the strip 102 to accommodate various thicknesses of the strip 102. In addition, more or less pressure may be applied by the carriage 200 to increase the frictional force of the idle roller 180. For example, in humid or oily environments, the pressure applied by the carriage 200 may be increased.

When the idle roller 180 is also driven, a second stepper motor (not shown) may be mounted to the carriage 200 so that the second stepper motor moves up and down with the carriage 200. The second stepper motor directly drives the idle roller 180 in unison with driving of the drive roller 130 by the stepper motor 190. Alternatively, the idle roller 180 may be driven from the stepper motor 190 via a belt/chain or gear train. In another alternative, the stepper motor 190 may directly drive the idle roller 180, and the drive roller 130 is allowed to idle.

Downforce of the carriage 200 may be created in various ways. For example, air pressure may be used to press the carriage 200 against the drive roller 130. In addition, gravity may provide downforce. Further, springs and/or hydraulic pressure may apply downforce to the carriage 200. The air pressure or hydraulic pressure may be calibrated using a calibration procedure and/or may be manually set by an operator.

In various implementations, the drive roller 130 and/or the idle roller 180 may have a raised pattern that is imprinted on the strip as the strip passes between the drive roller 130 and the idle roller 180. This pattern may have aesthetic value. In addition, the raised pattern may offer a better grip of the strip 102, reducing slippage.

The stepper motor 190 is electronically controlled to advance a predetermined amount of the strip 102 past the cutting device 140. Once this predetermined amount has been fed, the cutting device 140 actuates a blade 210 to cut a piece off of the strip 102. For example only, the cutting device 140 may be actuated by air pressure.

Figure 2J:
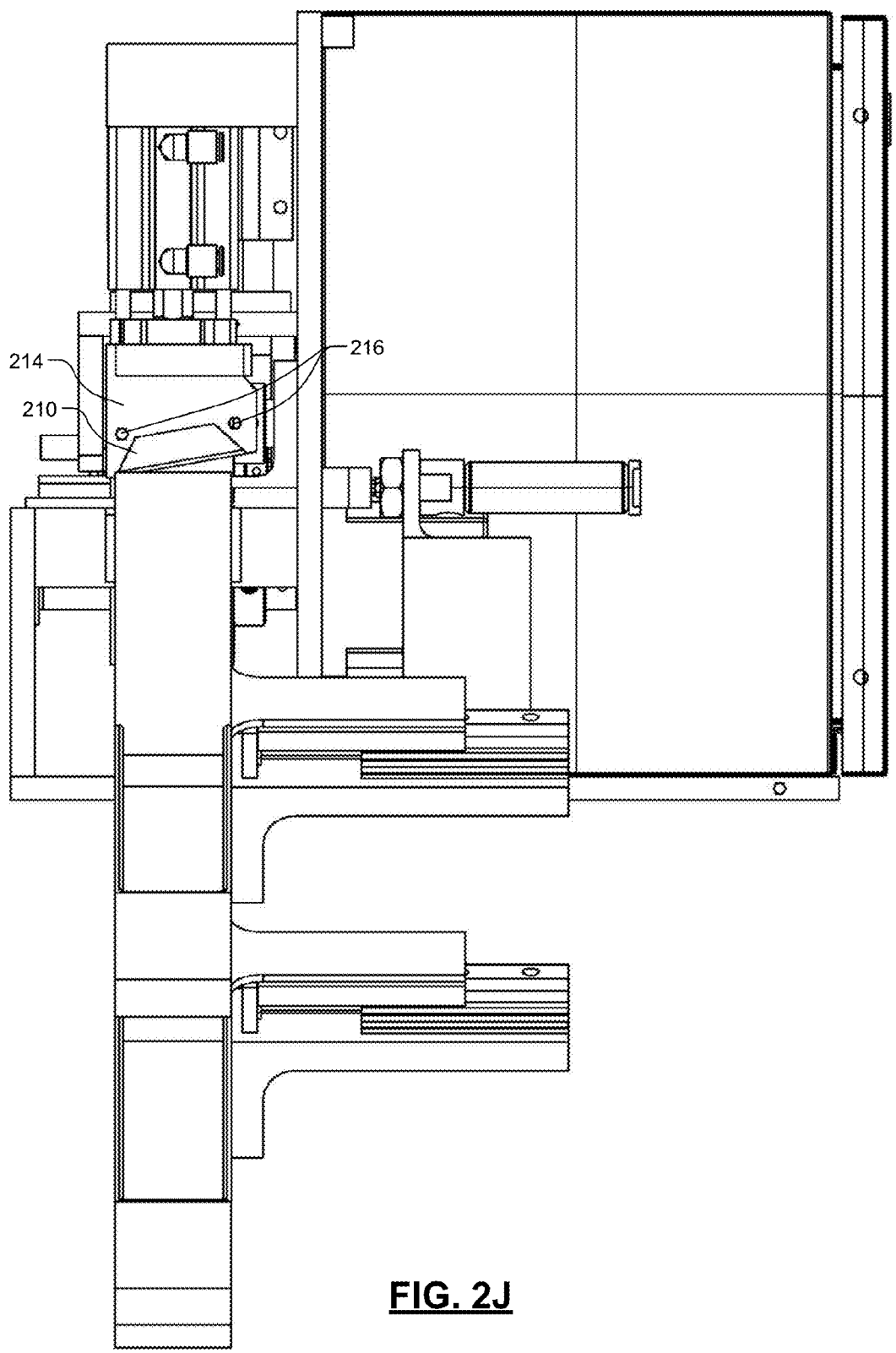
FIG. 2J is an end view of an exemplary implementation of a cutting apparatus according to the principles of the present disclosure.

As shown in more detail with respect to FIG. 2J, the blade 210 may be positioned so that the cutting edge is not perpendicular to the direction of travel of the blade 210. This causes the edge of the blade 210 to meet the strip 102 at a single point, which maximizes the cutting force of the blade 210, similar to an angled guillotine. The blade 210 may be a standard trapezoidally shaped utility knife blade. The blade may be secured in a cartridge that is mounted to the cutting device 140 without using tools for quick replacement. For example only, the cartridge may be secured by thumbscrews.

A slit 212 may be located beneath the blade 210. The blade 210 can therefore travel past the bottom of the strip 102, insuring a complete cut. The slit 212 may be only slightly wider than the thickness of the blade 210, thereby providing support on either side of the blade 210. This prevents the strip 102 from being pressed through the slit 212 by the blade 210, especially as the blade 210 dulls.

A shoe 220 may hold down the cut piece of material as the blade 210 retracts. The cut piece of weight material then falls free of the cutting apparatus 106. The shoe 220 may not contact a cut piece of weight material that is very short. In various implementations, a transport system, such as a conveyor, may take the cut piece of weight material from the location of the cutting apparatus 106 to a location where the piece of weight material will be applied.

Locating the cutting apparatus 106 away from the application location may be necessary to accommodate space constraints. Alternatively, bins may be located adjacent to the cutting apparatus 106. For example only, first and second bins 240 and 242 may be provided. The first and second bins 240 and 242 may correspond to first and second pieces of weight material for a given wheel/tire assembly. Each wheel/tire assembly may have two locations for application of wheel weight.

The first piece of weight material will be retrieved from the first bin 240 and applied to the first location, while the second piece of weight material will be retrieved from the second bin 242 and applied to the second location. A light may be associated with each of the bins 240 and 242 and may be illuminated to indicate from which of the bins 240 and 242 a piece of weight material should be retrieved.

A first diverter 250 may direct a piece of cut weight material from the cutting apparatus 106 to the first bin 240. A first actuator 252 may move the diverter 250 to the side, thereby allowing a piece of cut wheel material to fall to a second diverter 254, which then directs the cut weight material to the second bin 242. A second actuator 256 may move the second diverter 254 to the side. When both the first and second diverters 250 and 254 are moved to the side, the cut piece of weight material may fall into a discard bin.

For example, as described in more detail below, when a spliced section of the strip 102 is detected, the spliced section may be cut and discarded. In addition, pieces used for calibration and pieces at the beginning or end of a supply of weight material may be discarded. For example only, the first and second actuators 252 and 256 may be electrically powered or may be actuated by air pressure. A suction system may be used to remove the discarded pieces of weight material. The suction system may also dispose of the weight material backing when it is removed to apply the weight material to the wheel/tire assembly.

In various implementations, the backing material may be removed before the cut piece of weight material reaches the first diverter 250. For example, the backing material may be removed as the strip 102 passes the drive roller 130. In such a system, system components that will come into contact with the cut piece may be made from or coated with a nonstick coating. For example, the first and second diverters 250 and 254 and the first and second bins 240 and 242 may be plasma coated or coated with polytetrafluoroethylene (PTFE) or its equivalents.

The weight material may be applied by human operator or by a robot, with or without human assistance. A robotic application unit may be implemented in the system. The robotic application unit may retrieve the cut piece of weight material and apply the cut piece of weight material to an end effector. In various implementations, the robotic application unit may hold the piece of weight material with the end effector prior to the material being cut, eliminating the need to pick up the cut piece of weight material. The end effector may hold the material using any suitable system, including magnetic, vacuum, and/or mechanical gripping systems.

The robotic application unit then transports the piece of cut weight material to the wheel/tire assembly, where the end effector presses the piece of weight material against the appropriate spot on the wheel/tire assembly. In various implementations, a backing material with the weight material is removed by a second gripping apparatus. Alternatively, a vacuum may be used to remove the backing. The backing may be disposed of via a suction system.

Once the piece of weight material has been applied to the wheel/tire assembly, pressure may be applied across the length of the piece of weight material to wet-out the piece of weight material. This pressure may be applied by the end effector or by a second end effector.

In order for an operator to accurately place a piece of weight material on a given position of a wheel/tire assembly, a witness mark may be added to the piece of weight material by the cutting apparatus 106. The witness mark can then be aligned with a corresponding witness mark on the wheel.

For example only, a scribe cylinder 260 may be used to scribe a mark on the side of the strip 102. To accomplish this, the stepper motor 190 may advance half of the desired length of the strip 102, at which point the scribe cylinder 260 makes a scribe mark on the strip 102. The stepper motor 190 then advances the remaining portion of the desired length of the strip 102. Once the cutting device 140 cuts the piece of weight material from the strip 102, the scribe mark is located in the middle of the resulting piece.

The scribe cylinder 260 may actuate a scribe head 262 that creates an indentation on the side of the strip 102. For example only, the scribe cylinder 260 may be controlled by air pressure. Sensors may detect whether the various components of the system are operating correctly. For example only, sensors may measure whether the scribe cylinder 260 is actuating fully and whether the cutting device 140 is actuating fully.

A control enclosure 270 may include electronics that control the stepper motor 190, and when present, the second stepper motor. The stepper motor 190 and the second stepper motor may both receive the same electrical signals to ensure that they operate in unison. The electronics may include one or more processors and circuitry that performs some or all of the functions shown in FIG. 3. The control enclosure 270 may also include pneumatic and/or hydraulic control devices, such as solenoids. These solenoids may be electrically controlled to provide air and/or hydraulic pressure at various times, such as to actuate the blade 210 and the scribe cylinder 260. An air regulator with moisture separator may assure a clean air supply for pneumatic components.

In various implementations, the control enclosure 270 may include electronics that control both the dispensing apparatus 104 and the cutting apparatus 106. The control enclosure 270 may be separate from, or separable from, the remainder of the cutting apparatus 106. One or more wired or wireless links may allow communication between the control enclosure 270 and the cutting apparatus 106. In addition, one or more wired or wireless links may allow communication between the control enclosure 270 and the dispensing apparatus 104. The control enclosure 270 may provide one or more power supplies to the cutting apparatus 106 and/or the dispensing apparatus 104.

Referring now to FIG. 2J, the blade 210 is secured in a cartridge 214 by set screws 216. The cartridge 214 may slide onto a track of the cutting device 140 and be secured by one or more thumbscrews (not shown).

Figure 3:
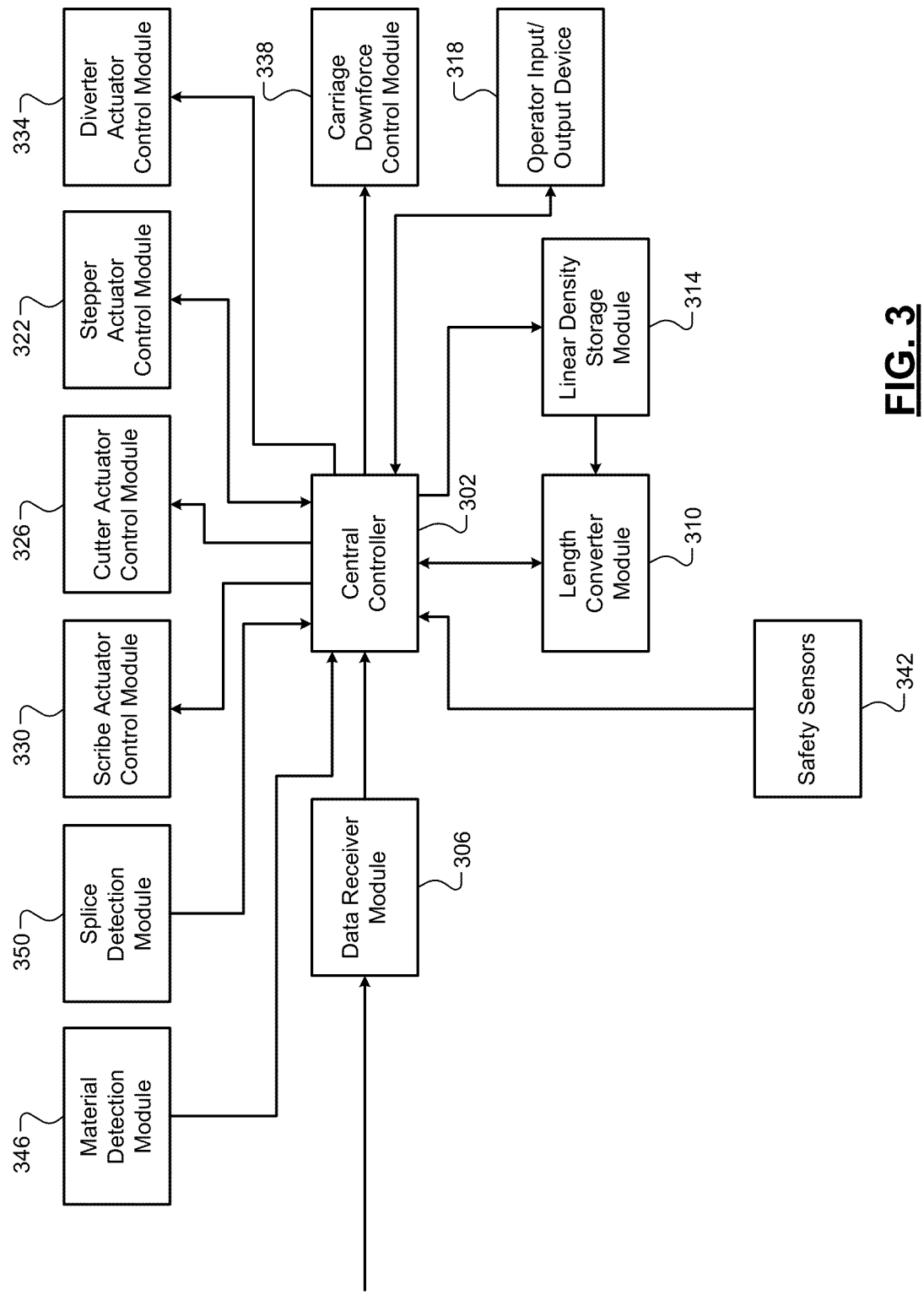
FIG. 3 is a functional block diagram of an exemplary implementation of control electronics for the system according to the principles of the present disclosure.

Referring now to FIG. 3, a functional block diagram of an exemplary control system of the control enclosure 270 is presented. A central control module 302 may receive weight data from a data receiver module 306. The data receiver module 306 may receive desired weight values from a balancing machine. For example only, the data receiver module 306 may receive data over a serial interface, a parallel interface, a factory control network, a local area network, or a direct electrical interface. For example only, supported communication protocols may include Ethernet, Datahighway Plus (DH+), controller area network (CAN), and DeviceNet. In various implementations, while the data receiver module 306 receives the desired weight values from the balancing machine, the desired weight values are transferred via another apparatus, such as a conveyor system, an upper-level system, a plant management system, and a data tracking system.

In various implementations, the data receiver module 306 may have a conversion front end (not shown) and a reference interface, such as RS232. The conversion front end converts an incoming interface to the reference interface. In this way, the conversion front end can be replaced when a new external interface is used, while retaining RS232 for internal communication.

The data receiver module 306 may receive two weight values for each wheel/tire assembly. The central control module 302 provides weight values to a length converter module 310, which converts the weight values into length values. This conversion is based on the linear density of the weight material, a value that may be stored in a linear density storage module 314.

The central control module 302 may provide a linear density value to the linear density storage module 314. Alternatively, the linear density storage module 314 may be preprogrammed with values of linear density for various available weight materials. The central control module 302 may then indicate to the linear density storage module 314 which material is being used.

In various implementations, the weight to length conversion may be performed by dividing the desired weight by the linear density of the weight material in use. The central control module 302 may communicate with an operator input/output device 318. The operator input/output device 318 may provide sensory feedback to an operator and/or may receive input from the operator.

For example only, the operator input/output device 318 may allow for the operator to supply the linear density of the weight material being used. Alternatively, the operator may indicate which weight material is being used, and the central control module 302 will select the corresponding linear density in the linear density storage module 314.

In other implementations, the operator input/output device 318 may offer the operator a selection of linear densities, from which the operator selects the correct linear density. In various implementations, various sensors may be present to determine the material's linear density. For example only, a calibration scale may be implemented. The central control module 302 may cause a predetermined length of material to be cut. The weight of this length of material, as measured by a calibration scale, and the requested length can be used to calculate linear density.

Alternatively, the calibration scale may be used to verify accuracy of the system. If the linear density as calculated based on the weight measured by the calibration scale does not match the expected density, the scale may be out of calibration, the material may be different than expected, and/or length errors may be present. This calibration process may also be manually initiated via the operator input/output device 318.

In various implementations, the central control module 302 may determine linear density of the weight material based on the cross-sectional profile of the weight material. The central control module 302 may include one or more sensors that determine the cross-sectional profile of the weight material. Based on these sensors, the central control module 302 can select or calculate the linear density of the weight material. In various implementations, the volumetric density of the weight material may remain approximately constant. The linear density can thereby be calculated from the volumetric density based on the cross-sectional area of the weight material.

Once the central control module 302 has determined a desired length to which to cut the weight material, the central control module 302 provides this length to a stepper actuator control module 322. The central control module 302 may convert the desired length into a number of steps for the stepper motor 190 and provide the length in units of steps.

The stepper actuator control module 322 then controls the stepper motor 190 to advance by the requested number of steps. Once the stepper actuator control module 322 has finished its movement, the stepper actuator control module 322 may transmit a completion signal to the central control module 302.

The central control module 302 may then request that a cutter actuator control module 326 actuate the cutting device 140. For example only, the cutter actuator control module 326 may energize a solenoid that allows air pressure to flow to the cutting device 140, thereby forcing the blade 210 through the weight material.

In various implementations, the central control module 302 may apply a scribe mark to the piece of weight material. Whether the scribe mark is applied, and to where the scribe mark is applied, may be determined by operator input from the operator input/output device 318. When a scribe mark will be added to the center of the piece, the central control module 302 may provide half the desired length to the stepper actuator control module 322.

After completion of this half length, the central control module 302 provides a signal to the scribe actuator control module 330. The scribe actuator control module 330 then actuates then actuates the scribe cylinder 260 to create the scribe mark. The central control module 302 then provides the remaining half length to the stepper actuator control module 322.

Once the stepper actuator control module 322 signals that the stepper motor 190 has advanced through the second half of the length, the central control module 302 then instructs the cutter actuator control module 326 to cut the weight material. The scribe mark will then be in the center of the cut piece.

The central control module 302 may provide commands to a diverter actuator control module 334. The diverter actuator control module 334 may direct cut pieces between different locations. For example only, the diverter actuator control module 334 may direct a cut piece between one or more bins and a discard bin. The diverter actuator control module 334 may also illuminate a light corresponding to the bin where the cut piece is located for retrieval by the operator.

The stepper motor 190 drives the drive roller 130, which is mounted in the carriage 200. The downforce of the carriage 200 against the weight material determines the frictional force, which prevents the weight material from slipping against the drive roller 130. The central control module 302 may modulate the amount of downforce via a carriage downforce control module 338. In various implementations, the carriage downforce control module 338 may control hydraulic and/or air pressure pressing the carriage 200 against the idle roller 180.

The central control module 302 may receive inputs from one or more safety sensors 342. For example only, the safety sensors 342 may sense whether maintenance doors are open. The central control module 302 may halt operation of various components, such as the cutter actuator control module 326 and the scribe actuator control module 330, when any of the safety sensors 342 indicate that a maintenance door is open.

This prevents the operator from coming in contact with moving parts. Emergency stop switches (not shown) may be located at various locations on both the cutting apparatus 106 and the dispensing apparatus 104. The emergency stop switches also halt operation of various components. This prevents operator injury and equipment damage in event of a fault.

In various implementations, the stepper actuator control module 322 may still be active when maintenance doors are open. The stepper actuator control module 322 may control the stepper motor 190 to advance, thereby drawing in new weight material when a new roll is begun. The operator may signal via the operator input/output device 318 to the central control module 302 that a new piece of material is being loaded. The stepper actuator control module 322 may then begin advancing the stepper motor 190 to draw in the new weight material.

A material detection module 346 may detect whether weight material is present. For example only, the material detection module 346 may detect once the roll of weight material has been used up. In this way, the central control module 302 can stop operation and not inadvertently output the last piece, which may be too short due to the weight material running out.

In addition, the central control module 302 will halt actuating the scribe cylinder 260 and the cutting device 140 when no weight material is present. When loading new material, the material detection module 346 may detect that the new weight material is present. The central control module 302 may then direct the stepper actuator control module 322 to advance the stepper motor 190 to draw the material into the cutting apparatus 106. The material detection module 346 may use various types of sensors. For example only, the material detection module 346 may interface with a photoelectric sensor, a mechanical sensor, an infrared sensor, and/or an ultrasonic sensor.

A splice detection module 350 may detect splices in the weight material. When one roll of weight material ends, a new roll of weight material can be spliced to the end of the old roll. In this way, operation is continuous, without having to feed a new roll of weight material. However, the splice itself may not be desirable for placing on a wheel/tire assembly.

Therefore, when the splice detection module 350 detects a splice, the central control module 302 may advance the length of the splice, cut the splice, and instruct the diverter actuator control module 334 to discard the material surrounding the splice. After a splice, a predetermined length of the new weight material may be cut and weighed to determine the linear density of the new weight material.

Splices may be created with adhesives that have different material properties than the surrounding weight material. For example only, the splicing material may be adhesive tape. The adhesive tape may have a higher optical reflectivity than the surrounding weight material. This change in optical reflectivity may be sensed by the splice detection module 350 as a splice.

In another example, electrical properties of the adhesive tape, such as magnetic permeability, may be different than the surrounding weight material. Alternatively, the splicing material may not be detectable by itself; additional material is added to allow for detection. For example only, the splicing tape may be undetectable, so reflective tape is applied over the splice.

The operator input/output device 318 may allow the operator to repeat the previous cut. For example, this feature may be used when a piece of weight material is dropped or misplaced. The operator input/output device 318 may also allow an operator to manually cut a piece of weight material to a given length or having a given weight. This may be useful when integrating with balancing machines that do not output weights in a digital format.

When integrating a system according to the present disclosure with prior art lead balancing stations, a large number of bins may be present, each having a different size of lead weight. The operator input/output device 318 may allow the operator to cut a predetermined number of pieces of a certain weight to replace the lead weights in one bin with cut pieces of the continuous weight material.

The operator input/output device 318 may allow the user to enter an upper limit and a lower limit, to define a range of weights, as well as an increment. The central control module 302 can then cut a predetermined number of pieces of each increment of weight, from the lower limit to the upper limit. In various implementations, control may pause between each increment, so the cut pieces can be removed from a collection bin and placed in the correct bin previously occupied by the lead weights. The operator can then signal via the operator input/output device 318 to begin cutting the next increment.

In various implementations, the operator input/output device 318 may be separate from, or separable from, the control enclosure 270. The control enclosure 270 may be separate from the cutting apparatus 106, the dispensing apparatus 104, and the operator input/output device 318. The control enclosure 270 may then be placed at any convenient location. Being separate, the operator input/output device 318 may be placed so as to best be accessible to the operator. By separating components, shipping, packaging, service, and replacement may be made easier and more cost-effective.

Referring now to FIG. 4A-4D, various views of an exemplary implementation of the dispensing apparatus 104 are presented. Weight material may be purchased and stored on the spool 110. The spool 110 is loaded into the dispensing apparatus 104 by opening first and second doors 408 and 412. The first and second doors 408 and 412 protect the operator from moving parts and may prevent debris from entering the dispensing apparatus 104.

The spool 110 has first and second ends 414 and 416 whose diameters are larger than the diameter of a center portion 418 of the spool 110. The first and second ends 414 and 416 ride on first and second axles 420 and 422. Each of the axles 420 and 422 may have a flanged roller, which correspond to the first and second ends 414 and 416. The flange of the flanged rollers prevents the spool 110 from moving in an axial direction along the axles 420 and 422.

In various implementations, a second spool (not shown) may be stored in the dispensing apparatus 104. The second spool may be located directed above the spool 110. The second spool may be stored in the dispensing apparatus 104 simply to be located conveniently. However, in various implementations, the dispensing apparatus 104 may include machinery that, once the spool 110 is removed, guides the second spool into the previous location of the spool 110. In fact, the dispensing apparatus 104 may include automated machinery that automatically (or upon actuation of a button or other operator input) replaces the spool 110 with the second spool.

Figure 4A:
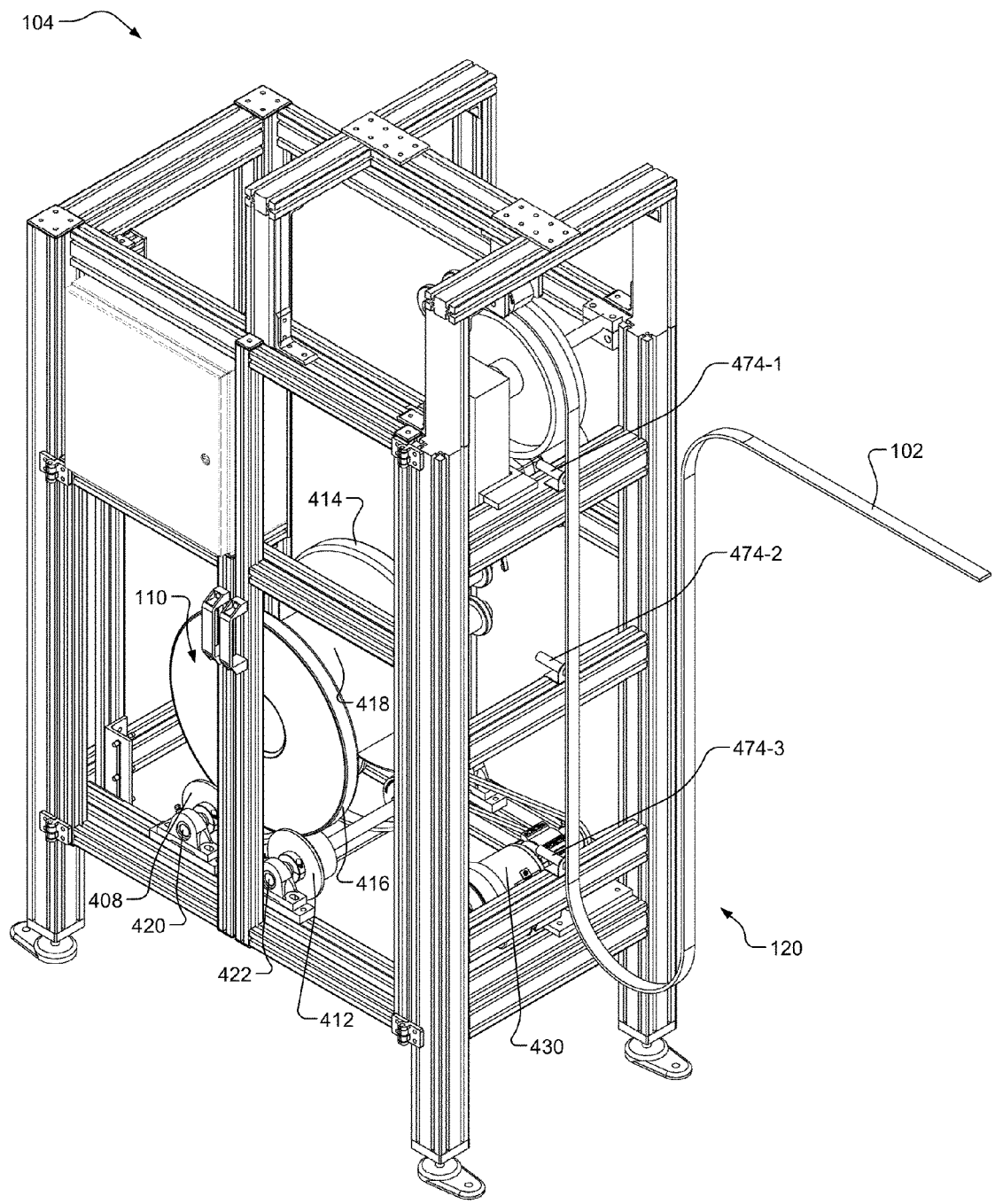
FIG. 4A is an isometric view of an exemplary implementation of a dispensing apparatus according to the principles of the present disclosure.
Figure 4B:
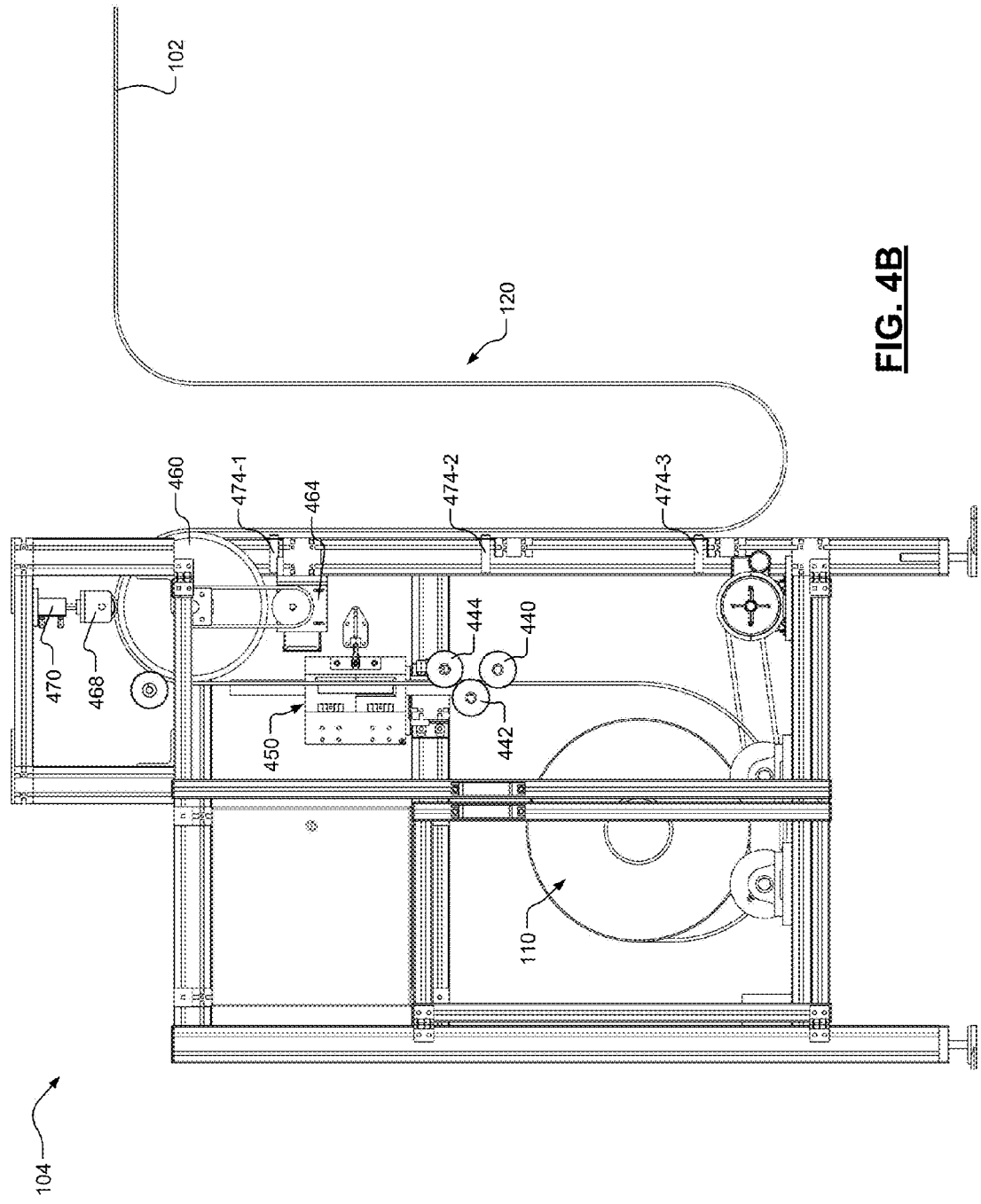
FIG. 4B is a front view of an exemplary implementation of a dispensing apparatus according to the principles of the present disclosure.
Figure 4C:
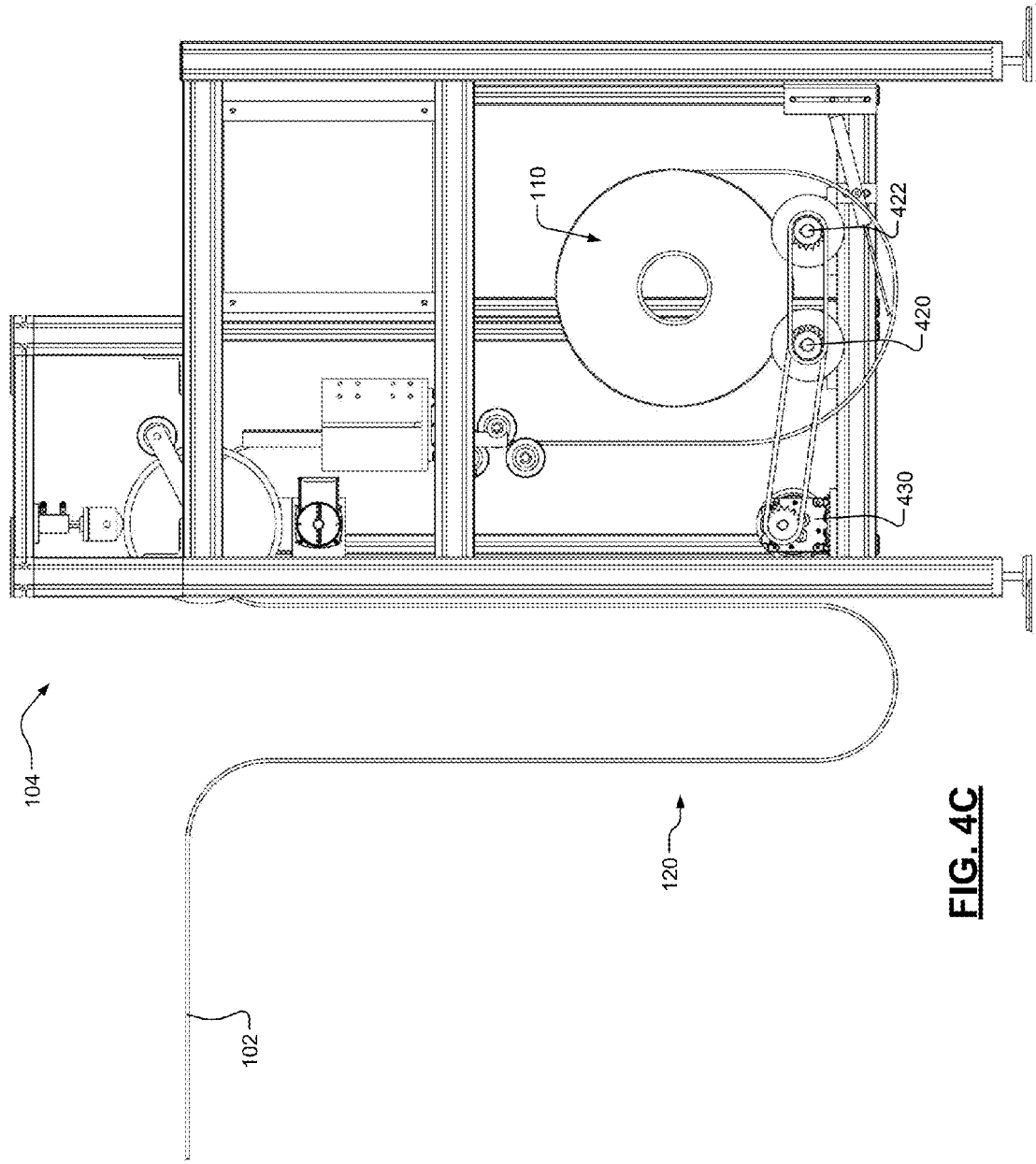
FIG. 4C is a rear view of an exemplary implementation of a dispensing apparatus according to the principles of the present disclosure.

As shown in FIGS. 4C-4D, the first and second axles 420 and 422 may be coupled via a chain or a belt. This causes the first and second axles 420 and 422 to rotate together. The first and second axles 420 and 422 may be driven by a motor 430 via another belt or chain. The motor 430 turns the first and second axles 420 and 422 in order to dispense more weight material from the spool 110.

Weight material from the spool 110 passes through first, second, and third rollers 440, 442, and 444. The weight material then passes through a splicing apparatus 450, which will be described in more detail below. In various implementations, the splicing apparatus 450 may be located in another position, such as on the exterior of the dispensing apparatus 104. The splicing apparatus 450 may be portable, and may be handheld—when not in use, the splicing apparatus 450 may then be temporarily affixed to the dispensing apparatus 104. The weight material then passes over a pulley 460. The pulley 460 is driven by a motor 464. The motor 464 turns the pulley 460 to provide the loop 120 of weight material.

The size of the loop 120 may be determined by operating requirements of the system and may be set to provide enough weight material so that a splice can be made while operation continues unabated using material from the loop 120. An idle roller 468 applies pressure to the weight material to keep the weight material from slipping against the pulley 460. Downforce is applied to the idle roller 468 by a downforce device 470. For example only, the downforce device 470 may include a spring. Alternatively, the downforce device 470 may be fixed in place, creating a fixed gap between the idle roller 468 and the pulley 460.

The dispensing apparatus 104 may include one or more sensors to determine the length of the loop 120. For example, as shown in FIGS. 4A and 4B, the dispensing apparatus 104 may include sensors 474-1, 474-2, and 474-3. If the length of the loop 120 decreases below a predetermined distance, operation of the cutting apparatus 106 may be halted to prevent the weight material from being pulled taught and slipping in the cutting apparatus 106.

The motor 464 may drive the pulley 460 to establish a predetermined length of the loop 120. When splicing is being performed, the motor 464 may fix the position of the pulley 460 to keep the strip 102 from moving and allow precise splicing. When splicing, the trailing end of the previous roll of weight material may be centered in the splicing apparatus 450. The previous spool 110 can be removed and replaced with a new spool 110 containing a new roll of weight material.

The new weight material may be threaded through the rollers 440, 442, and 444 so that the leading end of the new weight material butts up against the trailing end of the previous roll of weight material. The two ends are then joined. For example only, a length of adhesive tape may be present at the splicing apparatus 450. In order to join the leading end of the new weight material to the trailing end of the previous weight material, the operator may apply the piece of tape to the ends and apply enough pressure to ensure adhesion.

In addition, splice indicia may be applied to the weight material. For example only, reflective tape may be applied to allow for detection of the splice. Alternatively, marks, paint, or other indicia may be applied to the weight material. Once the splice is completed, the motor 464 may drive the pulley 460 to reestablish the desired length of the loop 120. The dispensing apparatus 104 may be designed to isolate access to the splicing apparatus 450 from access to the spool 110. In this way, the splicing apparatus 450 can only be accessed once the spool 110 is loaded and associated safety doors are closed. Then, the splice can be performed without exposing the operator to the mechanics of the motor 430 and the first and second axles 420 and 422.

For example only, during normal operation (when not splicing), the motor 464 may drive the pulley 460 such that a bottom of the loop 120 remains between the sensors 474-1 and 474-2. In various implementations, the sensors 474-1, 474-2, and 474-3 may be photoelectric sensors. The sensors 474-1, 474-2, and 474-3 may be diffuse sensors, which include both a light emitter and a detector, eliminating the need for separate light emitters or detectors on an opposite side of the loop 120.

When a splice is desired, the motor 464 may drive the pulley 460 to lower the bottom of the loop 120 to the sensor 474-3. In various implementations, once the bottom of the loop 120 reaches the sensor 474-3, the motor 464 may drive the pulley 460 a predetermined further amount, to lower the bottom of the loop 120 a predetermined distance below the sensor 474-3.

Alternatively, for splicing, the motor 464 may drive the pulley 460 until a trailing end of the weight material is located at a predetermined location (such as the middle) of the splicing apparatus 450. However, even if the trailing end has not yet reached the predetermined location of the splicing apparatus 450, the motor 464 may halt movement of the pulley 460 once the bottom of the loop 120 reaches the sensor 474-3, or at a predetermined distance thereafter. Once the bottom of the loop rises above the sensor 474-3, the motor 464 may once again actuate the pulley 460 to attempt to bring the trailing end of the weight material to the predetermined location of the splicing apparatus 450. Once splicing is complete, the motor 464 may resume controlling the bottom of the loop 120 to be between the sensors 474-1 and 474-2.

The motor 430 drives the first and second axles 420 and 422 in order to provide slack material from the spool 110. In this way, the frictional force required between the weight material and the pulley 460 is reduced. The spool 110 may be installed in such a way that a bottom loop 480 is created below the spool 110. A dancer switch 484 detects the height of the bottom loop 480.

The dancer switch 484 includes a rod 488 arranged in a direction perpendicular to the plane of FIG. 4D. The rod rides along the inside of the bottom loop 480. The dancer switch 484 pivots about a pivot point 490. As the bottom loop 480 moves up, indicating less slack is available, the dancer switch 484 pivots about the pivot point 490. A sensor 494 across the pivot point 490 from the rod 488 detects this condition and instructs the motor 430 to rotate the first and second axles 420 and 422 to provide more slack material.

Figure 5:
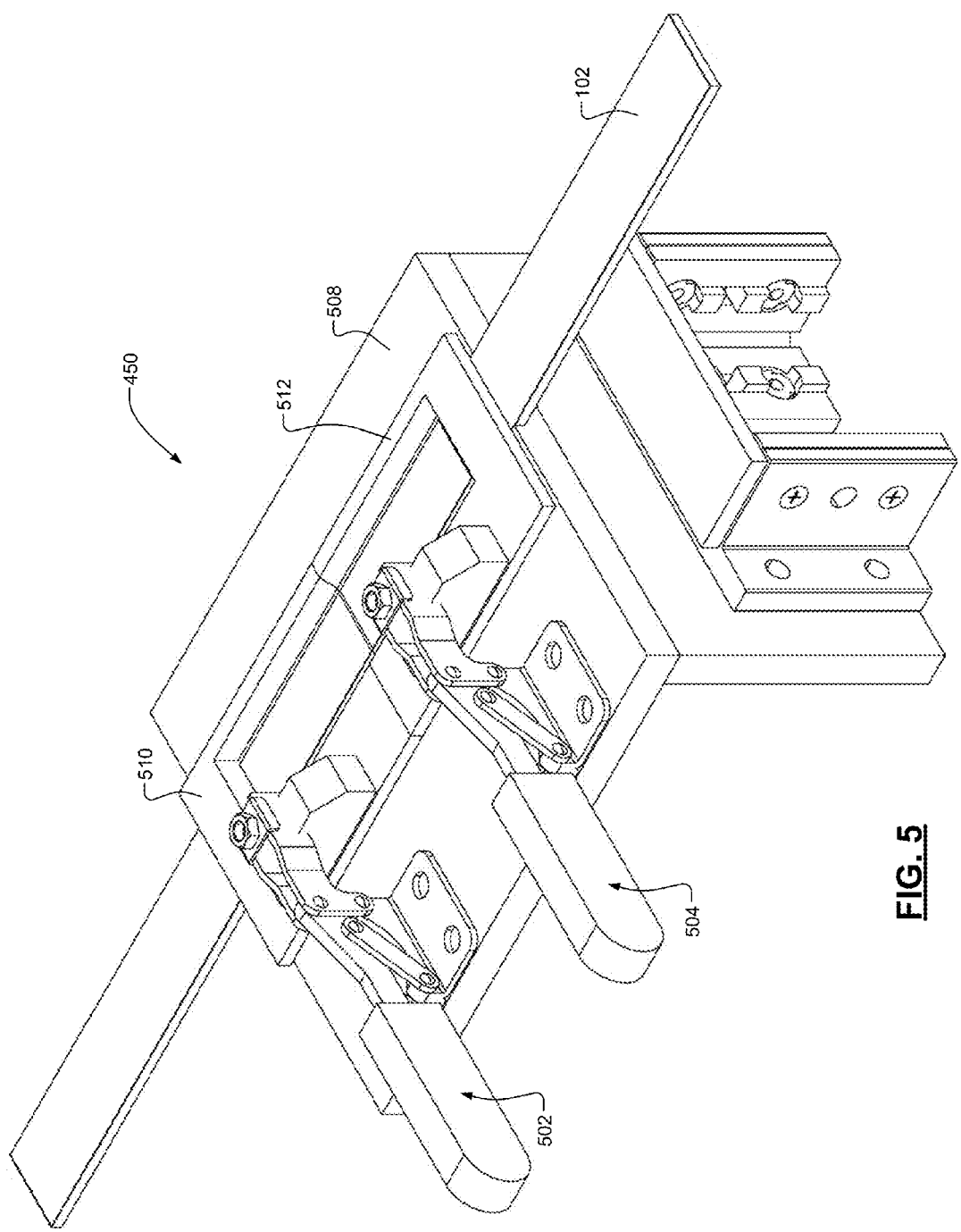
FIG. 5 is an isometric view of an exemplary implementation of a splicing apparatus according to the principles of the present disclosure.

Referring now to FIG. 5, an isometric view of an exemplary implementation of the splicing apparatus 450 is presented. First and second clamps 502 and 504 are mounted to a base plate 508. The first clamp 502 clamps the trailing end of the old weight material between a first shoe 510 and the base plate 508. The second clamp 504 clamps the leading end of the new roll of weight material between a second shoe 512 and the base plate 508. Adhesive tape (and, optionally, splice indicia, such as reflective tape) may be applied manually by an operator or by a mechanical apparatus. Once the splice has been accomplished, the first and second clamps 502 and 504 are released.

Figure 6:
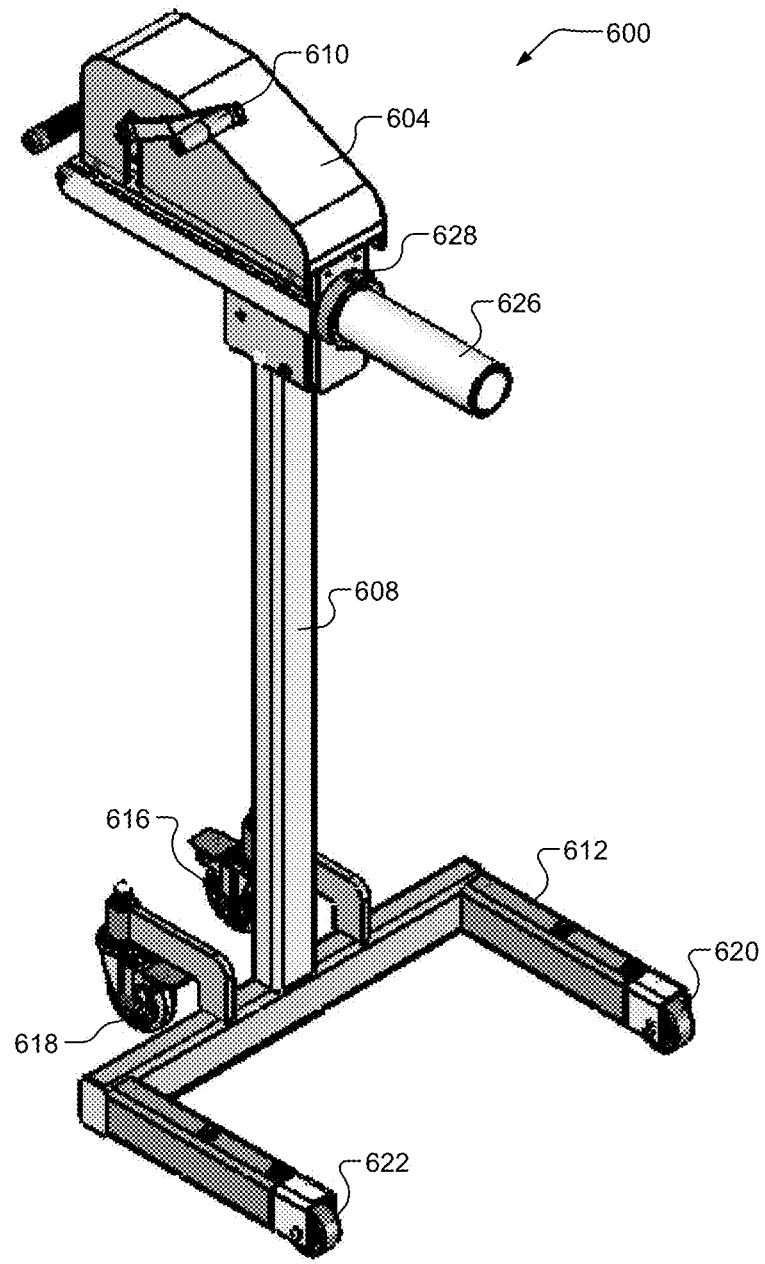
FIG. 6 is an isometric view of an exemplary implementation of a spool lift according to the principles of the present disclosure.

Referring now to FIG. 6, an isometric view of a spool lift 600 according to the principles of the present disclosure is presented. For example only, weight material may arrive in heavy spools, such as 200 pound or 250 pound spools. Multiple spools may arrive on a single pallet. The pallet may be stored close to the dispensing apparatus 104. Alternatively, the pallet may be stored remote from the dispensing apparatus 104. In such circumstances, one or more spools may be separately placed next to the dispensing apparatus 104.

The spool lift 600 includes a lifting head 604 that travels up and down a support beam 608. The lifting head 604 may be moved up and down the support beam by way of a manual crank 610. Alternatively, the lifting head 604 may be raised and/or lowered by an electric motor. The support beam 608 attaches to a base 612, which includes rear casters 616 and 618. The base 612 also includes front rollers 620 and 622. In various implementations, the spool lift 600 may be based on an MH-40 RollRunner Series Material Handling Cart from AzTech Machinery.

The lifting head 604 may be lowered along the support beam 608 until a lower mechanical hard stop (not shown) is reached. An arbor 626 projects from the lifting head 604. The lower mechanical hard stop may position the arbor 626 at the same height as the bore of the spool when the spool is sitting on the pallet. The arbor 626 is inserted into the bore of a spool of weight material.

The spool lift 600 is moved toward the spool until a stop ring 628 at the base of the arbor 626 contacts the spool. The operator then raises the lifting head 604, lifting the spool from the pallet. The lifting head 604 may be raised to an upper mechanical hard stop (not shown).

The spool lift 600 is then maneuvered to the dispensing apparatus 104. Guides (not shown) may be installed on the floor in front of the dispensing apparatus 104. The guides may force the rollers 620 and 622 in alignment with the dispensing apparatus 104. The spool lift 600 may then be moved toward the dispensing apparatus 104 until mechanical floor stops are reached. These mechanical floor stops are positioned so that the spool will be directly above the axles 420 and 422 of the dispensing apparatus 104.

At this point, the lifting head 604 can be lowered to the lower mechanical hard stop, thereby placing the weight of the spool onto the axles 420 and 422. The height of the rollers may be set to hold the spool at the same height as the spool would be held by the pallet. Therefore, when the lifting head 604 reaches the lower mechanical stop, the spool is resting on the rollers, and the spool lift 600 can be removed from the dispensing apparatus 104. As described above, material from the new spool may then be spliced to the material from the previous spool.

In a more automated implementation, the spool lift 600 of FIG. 6 may be replaced by a robotic spool lift. For operation in high temperature environments, portions of the dispensing apparatus 104 or the cutting apparatus 106 may be located in a temperature-controlled environment. For example only, circuitry present in the cutting apparatus 106 may be cooled. In addition, in environments with high amounts of particulate matter in the air, portions of the dispensing apparatus 104 and the cutting apparatus 106 may be located in an isolated chamber that uses filtered air.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An apparatus comprising:
   a receiving module that receives a desired weight value to correct an imbalance of a wheel/tire assembly;
   a conversion module that converts the desired weight value to a first length of wheel weight material based on a linear density of the wheel weight material;
   first and second rollers that engage first and second opposing sides of a continuous strip of the wheel weight material, wherein the linear density of the wheel weight material is approximately constant along the continuous strip;
   a stepper motor that directly drives the first roller based on the first length;
   a movable carriage that holds the second roller;
   a forcing member that applies pressure to the movable carriage in a direction toward the first roller;
   a scribe implement that selectively forms a scribe mark on the wheel weight material; and
   a cutting head that is selectively actuated to cut the wheel weight material.

2. The apparatus of claim 1 further comprising a scribe cylinder that selectively brings the scribe implement into contact with the wheel weight material.

3. The apparatus of claim 1 wherein the second roller is non-driven.

4. The apparatus of claim 1 wherein the movable carriage is movable along a vertical line.

5. The apparatus of claim 1 wherein the desired weight value is received from a balancing machine.

6. The apparatus of claim 1 wherein the conversion module selects the linear density based on a cross-sectional profile of the wheel weight material.

7. The apparatus of claim 1 wherein the conversion module selects the linear density based on a type of the wheel weight material.

8. The apparatus of claim 7 wherein the type of the wheel weight material is specified by an operator.

9. An apparatus comprising:
a receiving module that receives a desired weight value;
a conversion module that converts the desired weight value to a first length of wheel weight material based on a linear density of the wheel weight material;
first and second rollers that engage first and second opposing sides of a continuous strip of the wheel weight material, wherein the linear density of the wheel weight material is approximately constant along the continuous strip;
a motor that directly drives the first roller based on the first length;
a cutting head that is selectively actuated to cut the wheel weight material;
a scribe implement that selectively forms a scribe mark on the wheel material; and
a scribe cylinder that selectively brings the scribe implement into contact with the wheel weight material.

10. The apparatus of claim 9 further comprising a control module that selectively actuates the scribe implement when the first roller has fed approximately half of the first length of the wheel weight material.

11. The apparatus of claim 9 wherein the receiving module receives a second desired weight value to correct an imbalance of a wheel/tire assembly, the conversion module converts the second desired weight value to a second length, and the motor directly drives the first roller based on the second length.

12. The apparatus of claim 11 further comprising:
a first diverter that diverts a piece of the wheel weight material having the first length from a location of the cutting head into a first receptacle; and
a second diverter that diverts a piece of the wheel weight material having the second length from the location of the cutting head into a second receptacle.

13. The apparatus of claim 12 further comprising a waste receptacle that receives pieces of the wheel weight material that are not diverted by one of the first diverter and the second diverter.

14. The apparatus of claim 9 wherein the first roller includes an axle rotatably supported by bearings, wherein the axle is directly driven by the motor, and wherein the first roller and the axle are integrally formed from a single piece of material.

15. The apparatus of claim 9 wherein the motor comprises a stepper motor.

16. The apparatus of claim 2 wherein the second roller is non-driven.

17. The apparatus of claim 2 wherein the movable carriage is movable along a vertical line.

18. An apparatus comprising:
a receiving module that receives a desired weight value;
a conversion module that converts the desired weight value to a first length of wheel weight material based on a linear density of the wheel weight material;
first and second rollers that engage first and second opposing sides of a continuous strip of the wheel weight material. wherein the linear density of the wheel weight material is approximately constant along the continuous strip;
a first motor that drives the first oiler based on the first length;
a cutting head that is selectively actuated to cut the wheel weight material;
a second motor that directly drives the second roller;
a movable carriage that holds the second roller and the second motor; and
a forcing member that applies pressure to the movable carriage in a direction toward the first roller.

19. The apparatus of claim 2 wherein the first motor and the second motor comprise first and second stepper motors, respectively.

* * * * *